(12) United States Patent
Mizuuchi et al.

(10) Patent No.: US 7,738,162 B2
(45) Date of Patent: Jun. 15, 2010

(54) SHORT WAVELENGTH LIGHT SOURCE

(75) Inventors: Kiminori Mizuuchi, Osaka (JP); Hiroyuki Furuya, Nara (JP); Koichi Kusukame, Osaka (JP); Kenichi Kasazumi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 12/142,428

(22) Filed: Jun. 19, 2008

(65) Prior Publication Data

US 2008/0316590 A1 Dec. 25, 2008

(30) Foreign Application Priority Data

Jun. 21, 2007 (JP) ............................. 2007-163492

(51) Int. Cl.
*G02F 1/35* (2006.01)

(52) U.S. Cl. ...................................... 359/326; 359/330

(58) Field of Classification Search .......... 359/326–330
See application file for complete search history.

(56) References Cited

U.S. PATENT DOCUMENTS 5,253,102 A * 10/1993 Okazaki ..................... 359/328

2002/0126715 A1 * 9/2002 Gerstenberger et al. ....... 372/22
2007/0064749 A1 * 3/2007 Kaneda et al. ................ 372/21
2007/0263693 A1 * 11/2007 Essaian et al. ................ 372/75
2008/0158638 A1 * 7/2008 Furuya et al. ............... 359/237

FOREIGN PATENT DOCUMENTS

| JP | 11-271823 | 10/1999 |
| JP | 2002-350914 | 12/2002 |
| JP | 2007-94424 | 4/2007 |

* cited by examiner

*Primary Examiner*—Hemang Sanghavi
(74) *Attorney, Agent, or Firm*—Wenderoth, Lind & Ponack, L.L.P.

(57) ABSTRACT

A short wavelength light source is provided with a fundamental wave light source for generating a fundamental wave, and a plurality of wavelength conversion elements made of nonlinear optical crystals having periodic polarization-inversion structures and adapted to convert a part of the fundamental wave into a second harmonic, and the nonlinear optical crystals of the plurality of wavelength conversion elements are different in material or composition. By converting the fundamental wave from the fundamental wave light source by the plurality of wavelength conversion elements, the generation of a thermal lens effect caused by light absorption can be suppressed to improve a high output resistance.

17 Claims, 23 Drawing Sheets

SHORT WAVELENGTH LIGHT SOURCE

BACKGROUND OF THE INVENTION

1. Technical Field

The present invention relates to a short-wavelength light source for converting a fundamental wave into a second harmonic using a wavelength conversion element.

2. Description of the Background Art

In the generation of a second harmonic utilizing a nonlinear optical effect, a coherent light as a fundamental wave from a fundamental wave light source can be converted into a second harmonic having a half wavelength. In this wavelength conversion, conversion efficiency can be improved and an high-output short wavelength light can be generated by an increase in the length of the wavelength conversion element or an increase in the power of the incident fundamental wave in the case of noncritical phase matching.

Here, in the wavelength conversion element using KTP as a nonlinear optical crystal, an increase in the power density of a fundamental wave or a second harmonic causes the generation of a color center called a gray track, whereby the fundamental wave and the second harmonic are absorbed. Upon the occurrence of the gray track, a local heat distribution is caused by absorption and the nonlinear optical crystal is destructively damaged. As a method for solving this, a method for dividing a crystal to obtain divided second harmonics is proposed in Japanese Unexamined Patent Publication No. H11-271823.

FIG. 29 is a construction diagram of a conventional short-wavelength light source. In FIG. 29, a part of a fundamental wave emitted from a fundamental wave light source 301 is wavelength-converted into a second harmonic H1 by a KTP crystal 302, thereby being separated into a fundamental wave F1 and the second harmonic H1 by a wavelength separating mirror 304. A part of the fundamental wave F1 is wavelength-converted into a second harmonic H2 by a next KTP crystal 303, and separated into a fundamental wave F2 and a second harmonic H2 by a wavelength separating mirror 305. In this way, by extracting the second harmonics in such a state where the power densities of the generated second harmonics do not exceed a specific value using a plurality of KTP crystals, efficiency is improved.

Japanese Unexamined Patent Publication No. 2007-94424 discloses a method by which a plurality of nonlinear optical crystals are arranged in a direction of a fundamental wave beam and the fundamental wave beam is incident on the respective nonlinear optical crystals via condensing optical systems for wavelength conversion.

Japanese Unexamined Patent Publication No. 2002-350914 discloses a method by which a plurality of nonlinear optical crystals are arranged in a direction of a fundamental wave beam and the fundamental wave beam is incident on the respective nonlinear optical crystals via condensing optical systems for wavelength conversion by the generation of a second harmonic or a sum frequency.

However, since the above conventional constructions require a plurality of nonlinear optical crystals and the second harmonics are emitted from different parts, a complicated optical system is required to use the second harmonics while multiplexing them, which has presented a problem of enlarging the light source. Further, since the output extracted from one nonlinear optical crystal is limited, many crystals are necessary to obtain a high output, which has caused a problem of making miniaturization and lower cost difficult. Since the maximum emission quantity of each beam is limited, there has been a problem of being difficult to realize a high-output single beam.

In the construction for wavelength-converting the fundamental wave beam by a plurality of wavelength conversion elements while condensing the fundamental wave beam by the condensing optical systems, there has been proposed a method for reducing the interference of beams generated by the wavelength conversion elements by rotating the polarizations of the beams generated by the respective wavelength conversion elements. However, there has been a problem of reducing conversion efficiency since the polarizations of the second harmonics generated by the respective wavelength conversion elements differ. Further, in the construction for causing the fundamental wave laser to be incident on different crystals and generating a short-wavelength light by the generation of a second harmonic or a sum frequency, the generation of a high-output second harmonic using a plurality of wavelength conversion elements is not considered.

SUMMARY OF THE INVENTION

An object of the present invention is to provide a short-wavelength light source capable of converting a fundamental wave into a high-output second harmonic with high efficiency.

One aspect of the present invention is directed to a short wavelength light source, comprising a fundamental wave light source for generating a fundamental wave; and a plurality of wavelength conversion elements made of nonlinear optical crystals having periodic polarization-inversion structures and adapted to convert a part of the fundamental wave into a second harmonic, wherein the nonlinear optical crystals of the plurality of wavelength conversion elements are different in material or composition.

According to the present invention, a fundamental wave can be converted into a high-output second harmonic with high efficiency since the materials or compositions of the nonlinear optical crystals of the plurality of wavelength conversion elements differ.

These and other objects, features, aspects and advantages of the present invention will become more apparent upon a reading of the following detailed description and accompanying drawings.

DESCRIPTION OF PREFERRED EMBODIMENTS

Figure 1:
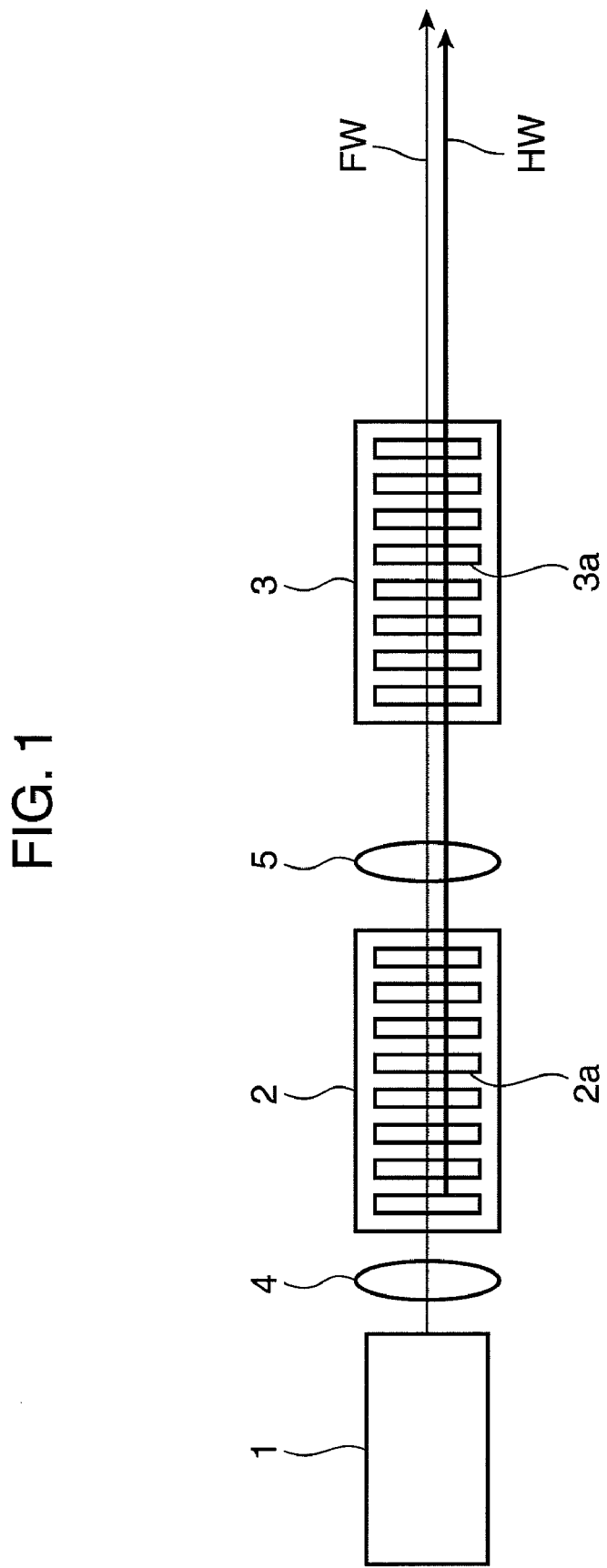
FIG. 1 is a diagram showing an exemplary construction of a short-wavelength light source according to a first embodiment of the invention.

The present invention achieves a high-output visible light source using wavelength conversion elements. Specifically, the present invention achieves a stable output characteristic by solving output instability at the time of a high output and a reliability problem. A wavelength conversion element made of a nonlinear optical crystal having a periodic polarization-inversion structure is capable of high efficiency wavelength conversion, especially high efficiency wavelength conversion by a single-path configuration, which has been conventionally difficult. However, a phenomenon in which the resistance of the crystal is insufficient and an output becomes unstable due to the generation of a high-output visible light has been observed. In order to solve this problem, a nonlinear optical crystal having a good high output resistance needs to be used. However, since a resistant material has low conversion efficiency, there has been a problem of being difficult to wavelength-convert a fundamental wave from a fundamental wave light source with high efficiency. A method for solving this problem is described below.

As described above, the present invention aims to achieve a high-output short wavelength light source by wavelength conversion elements utilizing periodic polarization-inversion structures. A wavelength conversion element made of a nonlinear optical crystal having a periodic polarization-inversion structure is capable of high efficiency wavelength conversion due to a high nonlinear optical constant and a long action length given by a noncritical phase matching condition.

Among nonlinear optical crystals having periodic polarization-inversion structures, $LiNbO_3$ doped with Mg or the like is a transparent material having a maximum nonlinear optical constant in a visible region and has good resistance to optical damage, whereby high efficiency conversion is achieved. However, our experimental results elucidated that a laser damage having a mechanism different from KTP occurred in this material as well and there was a limit to high output resistance. Accordingly, by proposing a new construction utilizing a periodic polarization-inversion structure, a short wavelength light source capable of obtaining a high output and being miniaturized was achieved.

First of all, a phenomenon discovered in Mg-doped $LiNbO_3$ (hereinafter, "PPMgLN") having a periodic polarization-inversion structure is described. When a fundamental wave having a wavelength of 1064 nm was wavelength-converted by PPMgLN to generate a second harmonic of green light having a wavelength of 532 nm, it was found out that an output became unstable and a laser damage occurred in the crystal if the green light exceeded 3 W. As a result of investigating the cause, the following phenomenon was elucidated.

Upon converting a fundamental wave of 1064 nm into a second harmonic of 532 nm by PPMgLN, ultraviolet radiation of 355 nm is generated by a sum frequency of the fundamental wave and the second harmonic. Since conversion efficiency into 355 nm is very low, only a small amount of light of 355 nm is generated upon wavelength-converting a high output. If the light of 355 nm is generated, the absorption of the green light increases and the output of the second harmonic becomes unstable due to a thermal lens effect. If the output is further increased, the crystal is damaged. This phenomenon is a cause of instability at the time of a high output, which is different from that of KTP, and is peculiar to PPMgLN. The construction of a new short wavelength light source for solving such a problem of high output characteristic deterioration is specifically described below.

First Embodiment

FIG. 1 is a construction diagram of a short wavelength light source according to a first embodiment of the present invention. The short wavelength light source shown in FIG. 1 is a coherent light source and includes a fundamental wave light source 1, wavelength conversion elements 2, 3 arranged in multistage and two condensing optical systems 4, 5. The wavelength conversion elements 2, 3 are made of nonlinear optical crystals having periodic polarization-inversion structures 2a, 3a, and the material or composition of the nonlinear optical crystal of the wavelength conversion element 2 differs from that of the nonlinear optical crystal of the wavelength conversion element 3.

After being condensed by the condensing optical systems 4, 5, a fundamental wave FW emitted from the fundamental wave light source 1 is wavelength-converted into a second harmonic HW by the wavelength conversion elements 2, 3 arranged in a propagation direction of the fundamental wave FW. At this time, the second harmonic HW generated by the wavelength conversion element 2 in the front stage and the one generated by the wavelength conversion element 3 in the rear stage are added to increase the second harmonic HW. Accordingly, the power density of the second harmonic HW is maximized in the wavelength conversion element 3, and a maximum output is limited by the limit of this power density.

Here, if the wavelength of the fundamental wave FW was 1064 nm, that of the second harmonic HW was 532 nm and PPMgLN was used for both wavelength conversion elements 2, 3, the limit of the output was about 3 W. If the output was increased any further, it became unstable. Further, in the case of using Mg-doped $LiTaO_3$ (hereinafter, "PPMgLT") having a periodic polarization-inversion structure for both wavelength conversion elements 2, 3, conversion efficiency was reduced to ⅓ of that of PPMgLN and it became difficult to achieve high efficiency.

Since a high output is achieved by improving the limit of a high output characteristic in the wavelength conversion element 3 in this embodiment, the wavelength conversion elements 2, 3 are made of different materials. As a specific example, the wavelength of the fundamental wave FW was set to 1064 nm, that of the second harmonic HW was set to 532 nm, a PPMgLN crystal having the periodic polarization-inversion structure 2a was used as the wavelength conversion element 2 and a PPMgLT crystal having the periodic polarization-inversion structure 3a was used as the wavelength conversion element 3. In other words, a high-output green light of about 6 W can be generated by using PPMgLN capable of high efficiency conversion for the wavelength conversion element 2 in the first stage having a lower output of the second harmonic and performing a wavelength conversion by PPMgLT of the wavelength conversion element 3 in the second stage after the power of the second harmonic is increased. Conversion efficiency was increased twofold or more as compared with the case where only PPMgLT was used.

The reason why the high output resistance of PPMgLT is higher than that of PPMgLN results from the fact that the thermal conductivity of the PPMgLT crystal is larger than that of the PPMgLN crystal. Accordingly, heat generation by absorption is suppressed, wherefore a thermal lens effect is suppressed and the high output resistance is improved. For example, in the construction of FIG. 1, a green output of 6 W with conversion efficiency of 50% in response to an input of a fundamental wave of 12 W was obtained using a PPMgLN crystal having a length of 10 mm as the wavelength conversion element 2 and a PPMgLT crystal having a length of 15 mm as the wavelength conversion element 3. In order to achieve similar conversion efficiency by a single element, the element length needs to be 60 to 70 mm, temperature tolerance is very strict and it is difficult to fabricate in the case of PPMgLT. On the contrary, in the construction of this embodiment, high efficiency conversion is possible even if the elements are short.

Although the two wavelength conversion elements 2, 3 are used in this embodiment, the present invention is also applicable in the case where three or more wavelength conversion elements are used. In this case, conversion efficiency can be further improved by increasing the number of wavelength conversion elements.

In the case of using three or more wavelength conversion elements, it is preferable to increase the high output resistance of the wavelength conversion element at the final end in the propagation direction of the fundamental wave. In this case, a higher output can be obtained by improving resistance to the harmonic output that is maximized at the final end.

A nonlinear optical crystal having a large thermal conductivity is preferably used as such an element having an improved high output resistance. For example, PPMgLT can suppress the generation of a thermal lens by light absorption since having a thermal conductivity twice or more as large as that of PPMgLN. A nonlinear optical crystal whose absorption end in an ultraviolet region is located more toward a short wavelength side is preferably used as an element having an improved high output resistance. In this case, the absorption of third harmonics generated by the second harmonic and the fundamental wave can be reduced since the absorption of ultraviolet rays can be reduced. As a result, an effect of absorbing visible light in a color center caused by the generation of ultraviolet rays can be reduced and the thermal lens effect can be suppressed.

Although the PPMgLT crystal is used as the wavelength conversion element 3 at the final end in this embodiment, PPKTP or PPsLT having a periodic polarization-inversion structure formed in a stoichiometric $LiTaO_3$ crystal (PPSLT) or a periodic polarization-inversion structure formed in a Mg-doped stoichiometric $LiTaO_3$ crystal (PPMgSLT) may be used instead. These materials are effective in obtaining higher outputs since having a good high output resistance. PPMgSLT has a good high output resistance since having an advantage of having a low turnover voltage and being able to obtain a uniform polarization-inversion structure and having a thermal conductivity about twice as large as that of PPMgLN.

On the other hand, a nonlinear optical crystal having a periodic polarization-inversion structure in a $LiNbO_3$ crystal containing at least any one of Mg, Zn, Sc, In and the like is preferably used as the wavelength conversion element 2, which outputs a weaker second harmonic and is arranged in the stage closer to the fundamental wave light source 1, in addition to PPMgLN shown in this embodiment. In this case, the $LiNbO_3$ based wavelength conversion element is capable of high efficiency conversion and effective for the higher efficiency of the short wavelength light source since having highest conversion efficiency in the visible region.

The thermal conductivity of a nonlinear optical crystal is known to largely differ depending on its composition. For example, the thermal conductivity of $LiNbO_3$ or $LiTaO_3$ differs depending on a ratio of Li to Nb in the crystal composition or a ratio of Li to Ta in the crystal composition. In general crystals, a crystal having a stoichiometric composition approximate to an ideal crystal structure has a higher thermal conductivity than a crystal having a congruent composition.

More specifically, the thermal conductivity of MgO:$LiNbO_3$ having a congruent composition (Li:Nb=48.5:51.5) is 4.63 (W/mk) and that of MgO:$LiNbO_3$ having a stoichiometric composition (Li:Nb=50:50) is 5.62 (W/mK). The thermal conductivity of $LiTaO_3$ having a congruent composition (Li:Ta=48.5:51.5) is 4.62 (W/mk), that of LiTaO$_3$ having a stoichiometric composition (Li:Ta=50:50) is 8.78 (W/mK) and that of MgO:LiTaO$_3$ having a stoichiometric composition (Li:Ta=50:50) is 8.43 (W/mK).

For example, by arranging a wavelength conversion element with a periodic polarization-inversion structure made of MgO:LiNbO$_3$ having a congruent composition near the fundamental wave light source 1 and a wavelength conversion element made of MgO:LiTaO$_3$ having a stoichiometric composition near an emergent part of the short wavelength light source, higher outputs can be achieved. Further, by arranging a wavelength conversion element with a periodic polarization-inversion structure made of MgO:LiNbO$_3$ having a congruent composition near the fundamental wave light source 1 and a wavelength conversion element made of MgO:LiTaO$_3$ having a stoichiometric composition near an emergent part of the short wavelength light source, the element having a larger thermal conductivity can be arranged at a high output side, wherefore high efficiency and higher outputs can be achieved.

Second Embodiment

Figure 2:
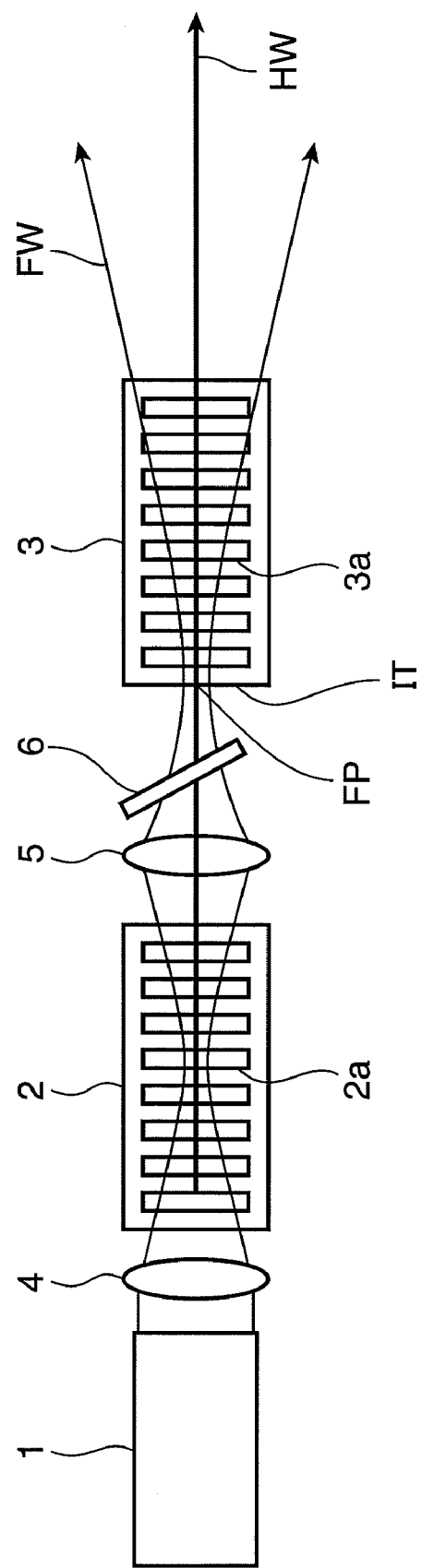
FIG. 2 is a diagram showing an exemplary construction of a short-wavelength light source according to a second embodiment of the invention.

FIG. 2 is a construction diagram of a short wavelength light source according to a second embodiment of the present invention. The short wavelength light source shown in FIG. 2 includes a fundamental wave light source 1, wavelength conversion elements 2, 3, condensing optical systems 4, 5 and a wavelength filter 6. In the short wavelength light source shown in FIG. 2, even higher outputs can be obtained by the optical design of the condensing optical system 5.

In FIG. 2, a fundamental wave FW emitted from the fundamental wave light source 1 is wavelength-converted into a second harmonic HW by the wavelength conversion elements 2, 3 arranged in a propagation direction of the fundamental wave FW. At this time, the second harmonic HW generated by the wavelength conversion element 2 in the front stage and the one generated by the wavelength conversion element 3 in the rear stage are added to increase the second harmonic HW.

A feature of this embodiment is that a focal point FP of the fundamental wave condensed by the condensing optical system 5 is set near an incident end IT of the wavelength conversion element 3. An arrangement of a condensing optical system for maximizing conversion efficiency in a wavelength conversion element is to locate a focal point in the center of the wavelength conversion element as in the wavelength conversion element 2 in the front stage. On the contrary, in this embodiment, the focal pint FP is set near the incident end IT of the wavelength conversion element 3. Since a beam diameter is increased by this construction even if the second harmonic HW increases in the wavelength conversion element 3, the power density of the second harmonic HW can be lower than an optimal condensed state. Thus, the intensity of ultraviolet rays generated by a sum frequency of the fundamental wave and the second harmonic can be reduced and a thermal lens effect by the absorption of the second harmonic can be reduced. As a result, a high output characteristic can be improved to about 10 W.

Here, the position of the focal point FP is preferably set about ±L/4 from the incident end IT with respect to an element length L of the wavelength conversion element. This is because an improvement in high output characteristic is hindered if the focal point FP approaches the center from the incident end IT by more than L/4, whereas conversion efficiency is considerably reduced if the focal point FP is distanced forward by L/4 or longer from the incident end IT.

A construction for inserting a wavelength filter between wavelength conversion elements is also effective. In this embodiment, the wavelength filter 6 is arranged between the condensing optical system 5 located behind the wavelength conversion element 2 and the wavelength conversion element 3. The wavelength filter 6 has a property of transmitting the fundamental wave FW and the second harmonic HW while reflecting or absorbing ultraviolet rays having a wavelength of 355 nm, which is a sum frequency of the fundamental wave and the second harmonic, so that the ultraviolet rays generated from the wavelength conversion element 2 do not reach the wavelength conversion element 3. In this way, the high output resistance of the wavelength conversion element 3 can be improved. The condensing optical system 5 can additionally fulfill the function of the wavelength filter. For example, by separating wavelengths by coating on the condensing optical system 5, the condensing optical system 5 can have a filter function.

Although the two wavelength conversion elements 2, 3 are used in this embodiment, the present invention is also applicable in the case where three or more wavelength conversion elements are used. In this case, conversion efficiency can be further improved by increasing the number of wavelength conversion elements.

In the case of using three or more wavelength conversion elements, it is preferable to set the focal point at the final end in the propagation direction of the fundamental wave near the incident end of the wavelength conversion element. In this case, higher outputs can be obtained by improving resistance to harmonic outputs that are maximized at the final end.

Third Embodiment

Figure 3:
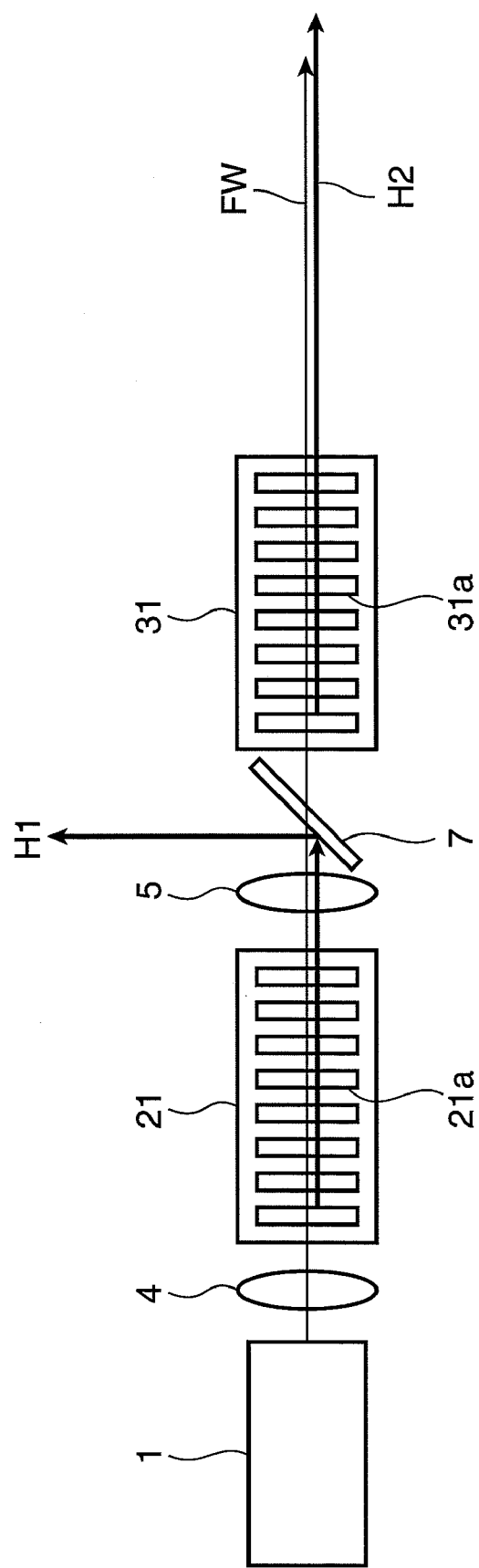
FIG. 3 is a diagram showing an exemplary construction of a short-wavelength light source according to a third embodiment of the invention.

FIG. 3 is a construction diagram of a short wavelength light source according to a third embodiment of the present invention. The short wavelength light source shown in FIG. 3 includes a fundamental wave light source 1, wavelength conversion elements 21, 31, condensing optical systems 4, 5 and a wavelength filter 7. In the construction of this embodiment using the wavelength conversion elements in multistage, harmonic components are separated.

In FIG. 3, a fundamental wave FW emitted from the fundamental wave light source 1 is wavelength-converted into a second harmonic H1 by a periodic polarization-inversion structure 21a of the wavelength conversion element 21. The second harmonic H1 is separated from the fundamental wave FW by the wavelength filter 7 that functions as a wavelength separating mirror. Thereafter, the fundamental wave FW is further wavelength-converted into a second harmonic H2 by a periodic polarization-inversion structure 31a of the wavelength conversion element 31. In this way, in the construction of this embodiment, increases in the power densities of the second harmonics in the wavelength conversion elements 21, 31 are suppressed by individually performing wavelength conversions to obtain a higher output.

In this construction, a new problem was found in the case of using PPMgLN having high conversion efficiency as the wavelength conversion element 21 in the front stage. Specifically, when wavelength conversion was performed by the wavelength conversion element 21 in the front stage until the output of the second harmonic H1 became about 3 W and the beam quality of the fundamental wave FW separated by wavelength was measured, it was elucidated that M2 of the beam was deteriorated and conversion efficiency in the wavelength conversion element 31 in the rear stage is considerably reduced from a theoretical value.

In order to solve this problem, PPMgLT having a good high output resistance was used for the wavelength conversion element 21 for first converting the fundamental wave FW.

Although PPMgLT has low conversion efficiency, a large fundamental wave power can be obtained by using PPMgLT in the first stage. Thus, conversion efficiency of a certain degree could be ensured. Further, conversion efficiency becomes substantially equal if the length of the wavelength conversion element 21 is three times as large as that of PPMgLN. It was thus confirmed that a thermal lens generated in the element could be reduced and the deterioration of the beam quality could be suppressed if PPMgLT was used in the first stage. Therefore, high efficiency conversion could be achieved by using PPMgLN as the wavelength conversion element 31.

Since conversion efficiency was lower in this embodiment than in the construction of FIG. 1, the element length was longer at least twice, but a stable output characteristic could be obtained. For example, when PPMgLT having a length of 25 mm was used as the wavelength conversion element 21 and PPMgLN of 25 mm was used as the wavelength conversion element 31, a green light of 3 W and 532 nm and a green light of 3 W were respectively obtained as the second harmonics H1 and H2 from the fundamental wave FW of 12 W emitted from the fundamental wave light source 1 having a wavelength of 1064 nm, wherefore a high-output CW green light could be extracted with conversion efficiency of 50%.

In the case of using PPMgLN as the wavelength conversion element 21, a green light of 3 W could be extracted as the output of the second harmonic H1, but the output of the second harmonic H2 was reduced to or below 2 W. This is caused by the disturbance of the wavefront of the fundamental wave in PPMgLN.

Fourth Embodiment

Figure 4:
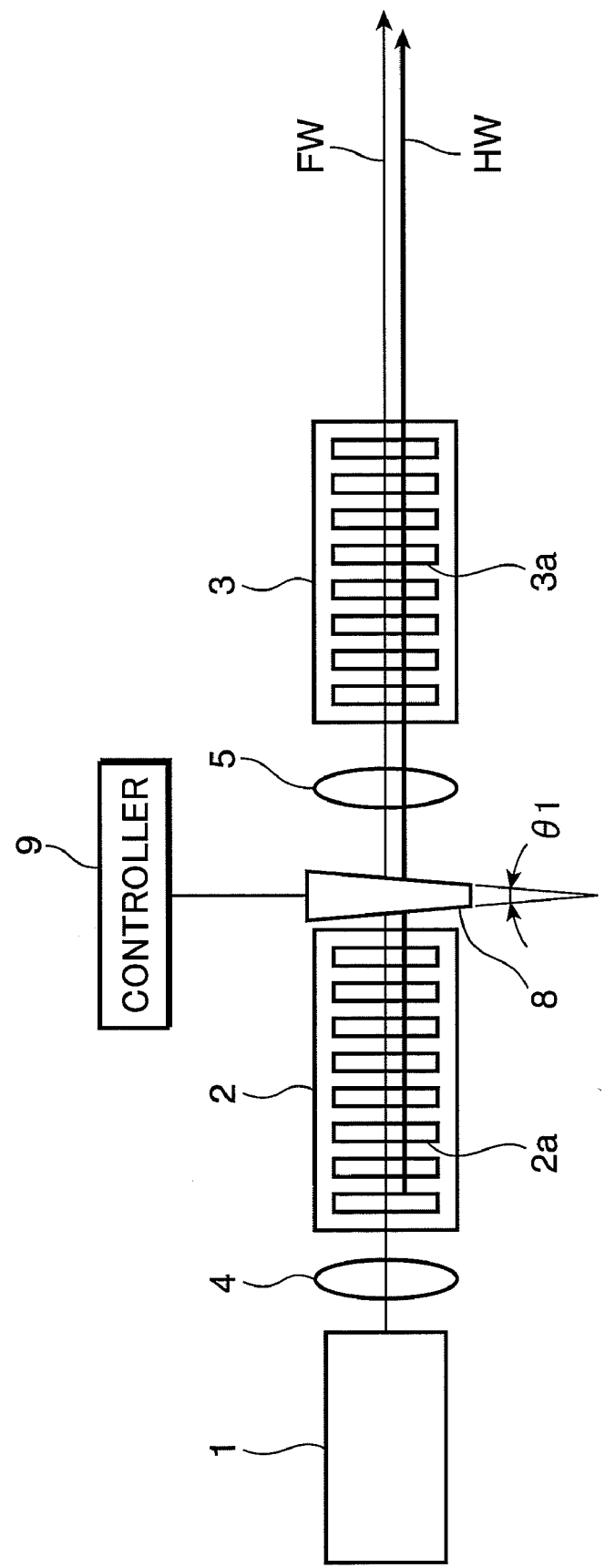
FIG. 4 is a diagram showing an exemplary construction of a short-wavelength light source according to a fourth embodiment of the invention.

Next, the achievement of high outputs by phase compensation in the construction of the above first embodiment is described as a fourth embodiment of the present invention with reference to FIG. 4. FIG. 4 is a construction diagram of a short wavelength light source according to the fourth embodiment of the present invention. The short wavelength light source shown in FIG. 4 includes a fundamental wave light source 1, wavelength conversion elements 2, 3, condensing optical systems 4, 5, a phase compensation plate 8 and a controller 9.

Although the fundamental wave is converted into the second harmonic by arranging a plurality of wavelength conversion elements in series in the above first embodiment, there are cases where the second harmonics generated by the two wavelength conversion elements are canceled out by a phase difference if no mechanism for compensating a phase difference of the second harmonics generated by the respective wavelength conversion elements. Thus, in order to achieve high efficiency conversion in a construction in which a plurality of wavelength conversion elements are arranged in series, a compensation mechanism for compensating a phase difference between the elements in a plane of a beam and in a propagation direction of the beam is necessary.

This compensation mechanism is described with reference to FIG. 4. A phase difference of second harmonics generated by two wavelength conversion elements is determined by the wavefront of a fundamental wave, incident and emergent surfaces of the wavelength conversion elements and periodic polarization-inversion structures, and the wavefront needs to coincide in the entire section of the second harmonic beam in order to achieve high efficiency. Thus, the short wavelength light source shown in FIG. 4 includes the phase compensation plate 8 and the controller 9 in addition to the construction of FIG. 1. The phase compensation plate 8 is made of a material having a dispersion characteristic with different refractive indices for the fundamental wave and the second harmonic. Further, optical path lengths when the fundamental wave and the second harmonic pass the phase compensation plate 8 change and the phases of the fundamental wave and the second harmonic can be matched by the controller 9 adjusting the position of the phase compensation plate 8.

The phase compensation plate 8 is preferably in the form of an acute-angle prism. Specifically, an apex angle $\theta1$ of the phase compensation plate 8 preferably satisfies a relationship: $\theta1 < \lambda/(2 \times R1 \times \Delta n)/10$ (radian) when R1 denotes the beam radius of the fundamental wave FW passing the phase compensation plate 8, $\Delta n$ a refractive index difference of the phase compensation plate 8 between the fundamental wave FW and the second harmonic HW and $\lambda$ the wavelength of the fundamental wave FW. This is because a phase difference between the fundamental wave and the second harmonic generated in the wavelength conversion element can be reduced to achieve high efficiency by setting a phase difference between the fundamental wave and the second harmonic having passed through the phase compensation plate 8 to or below $\lambda/10$ in the beam.

By changing the position of the phase compensation plate 8, the controller 9 can adjust the thickness of the phase compensation plate 8, through which the beam passes, thereby compensating the phase difference between the fundamental wave and the second harmonic. For example, in the case of fabricating a prism from molten quartz, the apex angle $\theta1$ of the phase compensation plate 8 <0.05 radians when R1=50 µm and $\lambda$=1.064 µm. In this case, design likelihood increases and the prism can be easily fabricated since quartz has small $\Delta n$.

Further, as shown in FIG. 4, the phase compensation plate 8 is preferably provided near an emergent part of the wavelength conversion element 2. If the phase fronts of the fundamental wave and the second harmonic outputted from the wavelength conversion element 2 are inclined, the beams are separated as propagating away from the wavelength conversion element 2, wherefore it becomes difficult to propagate the beams while coinciding in the wavelength conversion element 3.

The phase compensation plate 8 needs to compensate the phase difference between the second harmonic generated in the wavelength conversion element 2 and the one generated in the wavelength conversion element 3 in the plane of the beam of the second harmonic. A construction example of the phase compensation plate 8 for this purpose are shown in FIGS. 5 to 7.

Figure 5:
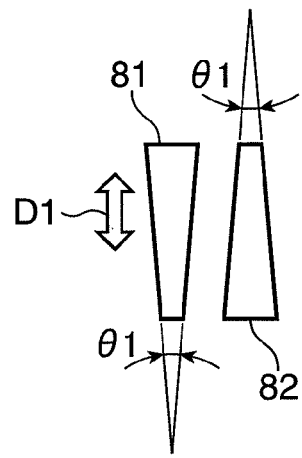
FIG. 5 is a side view of a phase compensation plate usable for the short-wavelength light source shown in FIG. 4.
Figure 6:
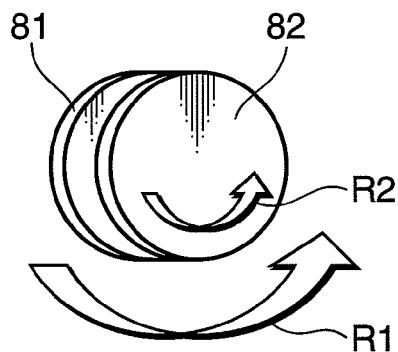
FIG. 6 is a perspective front view of the phase compensation plate shown in FIG. 5.
Figure 7:
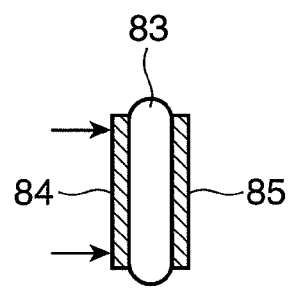
FIG. 7 is a diagram showing the construction of another phase compensation plate usable for the short-wavelength light source shown in FIG. 4.

First, FIGS. 5 and 6 are described. FIG. 5 is a side view of a phase compensation plate usable for the short wavelength light source shown in FIG. 4, and FIG. 6 is a perspective front view of the phase compensation plate shown in FIG. 5. The phase compensation plate shown in FIGS. 5 and 6 is comprised of two wedge plates 81, 82. The wedge plates 81, 82 are made of LiNbO$_3$.

As shown in FIG. 5, the wedge plates 81, 82 have the same wedge angle $\theta1$ and are arranged in an inverted manner so that the wedge angles are inverted. In this state, the controller 9 includes a specified actuator and a control circuit for driving the actuator and adjusts the overlap of one wedge plate 81 and the other wedge plate 82, for example, by moving the wedge plate 81 in a direction of arrow D1. As a result, the controller 9 can adjust a phase difference in a propagation direction between the fundamental wave and the second harmonic passing the wedge plates 81, 82 and can compensate for a phase shift in the propagation direction between the second harmonic generated in the wavelength conversion element 2 and the one generated in the wavelength conversion element 3.

Further, as shown in FIG. 6, the controller 9 includes a specified actuator and a control circuit for driving the actuator, adjusts an overall angle of wedge plates 81, 82 by integrally rotating the wedge plates 81, 82 in a direction of arrow R1, and adjusts a relative angle of the wedge plates 81, 82 by singly rotating the wedge plate 82 in a direction of arrow R2. By adjusting the relative angle of the wedge plates 81, 82 in this way, the inclinations of the wavefronts of the fundamental wave and the second harmonic passing the wedge plates 81, 82 can be compensated. Further, by rotating both wedge plates 81, 82 with respect to the beam, an inclining direction of the wavefronts can be compensated.

As described above, the phases in the plane of the beam passing the wedge plates 81, 82 can be adjusted by adjusting the overlap, the relative angle and the overall angle of the two wedge plates 81, 82. In this way, the phase of the second harmonic generated in the wavelength conversion element 2 and the one generated in the wavelength conversion element 3 can be matched in the propagation direction and in the beam plane, wherefore high efficiency wavelength conversion is achieved.

FIG. 7 is a construction diagram of another phase compensation plate usable for the short wavelength light source shown in FIG. 4. The phase compensation plate shown in FIG. 7 includes optical substrates 84, 85 and an optical gel 83, wherein the transparent optical gel 83 is sandwiched between the two optical substrates 84, 85.

A transparent high polymer gel usable for the phase compensation plate may be used for a convertible lens, for example, as disclosed in Japanese Unexamined Patent Publication No. H06-27305. Further, as disclosed in "Characteristics of optically controllable focusing lens generated in guest-host liquid crystals" by H. Ohno et al., Opti. Commun. 211 (2002), 309-318, there is an application example of a high polymer liquid crystal material to a convertible lens. In this case, a phase compensation plate for controlling a wavefront by an electric field can be constructed since the thickness of the gel can be changed by applying an electric field to the high polymer gel.

The controller 9 can control the wavefront of the second harmonic with respect to the fundamental wave by three-dimensionally changing the shape of the optical gel 83 constructed as described above and, for example, by inclining one optical substrate 84 with respect to the other optical substrate 85. By three-dimensionally moving the optical substrate 84 in this way, it becomes possible to control the wavefront of the second harmonic and to conform the phases of the second harmonics generated in the two wavelength conversion elements 2, 3 to each other. Any material transparent and variable in shape such as matching oil and plastic can be similarly used instead of gel.

In order to compensate the phase difference between the fundamental wave and the second harmonic in the beam plane to or below $\lambda/10$, the accuracies of end surfaces of the periodic polarization-inversion structures 2a, 3a and end surfaces of the wavelength conversion elements 2, 3 in the emitting part of the wavelength conversion element 2 and the incident part of the wavelength conversion element 3 need to be controlled. An angular displacement $\Delta\theta1$ between the end surfaces of the periodic polarization-inversion structures 2a, 3a and those of the substrates (wavelength conversion elements 2, 3) needs to be controlled to about $\Delta\theta1 < \lambda/(2 \times R2 \times \Delta n)/10$ with respect to a beam radius R2 on the end surfaces.

For example, in the case of MgLN, A01 needs to be smaller than about 1/140 radian. The phase compensation plate 8 is preferably disposed at such a position where the beam radius is small to relax angular accuracy and surface accuracy as can be understood from the relational expression of $\Delta\theta1$. In other words, phase compensation by the phase compensation plate 8 becomes easier by disposing the phase compensation plate 8 immediately behind the emergent part of the wavelength conversion element 2 or immediately before the incident part of the wavelength conversion element 3 to be located at such a position where the beam radius is minimized. Further, the beam diameter at the emergent end can be made smaller by moving the focal point of the condensing optical system 5 from the center of crystal to the vicinity of the emergent end.

The material of the phase compensation plate 8 is preferably quartz or the like having a small wavelength dispersion in order to make the refractive index difference $\Delta n$ between the fundamental wave and the second harmonic smaller. For example, $\Delta\theta1$ is about 1/140 radian in the case of fabricating the phase compensation plate 8 of LN, but $\Delta\theta1$ is about 1/20 radian and the phase compensation plate 8 can be easily fabricated in the case of quartz. This is because $\Delta n$ is smaller in the quartz having a small wavelength dispersion.

Fifth Embodiment

Figure 8:
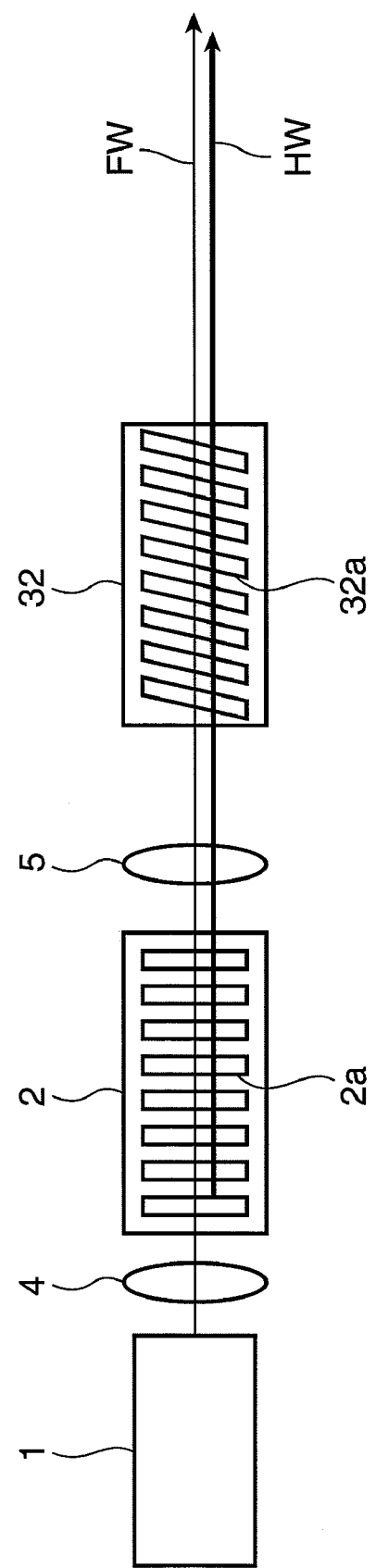
FIG. 8 is a diagram showing an exemplary construction of a short-wavelength light source according to a fifth embodiment of the invention.
Figure 9:
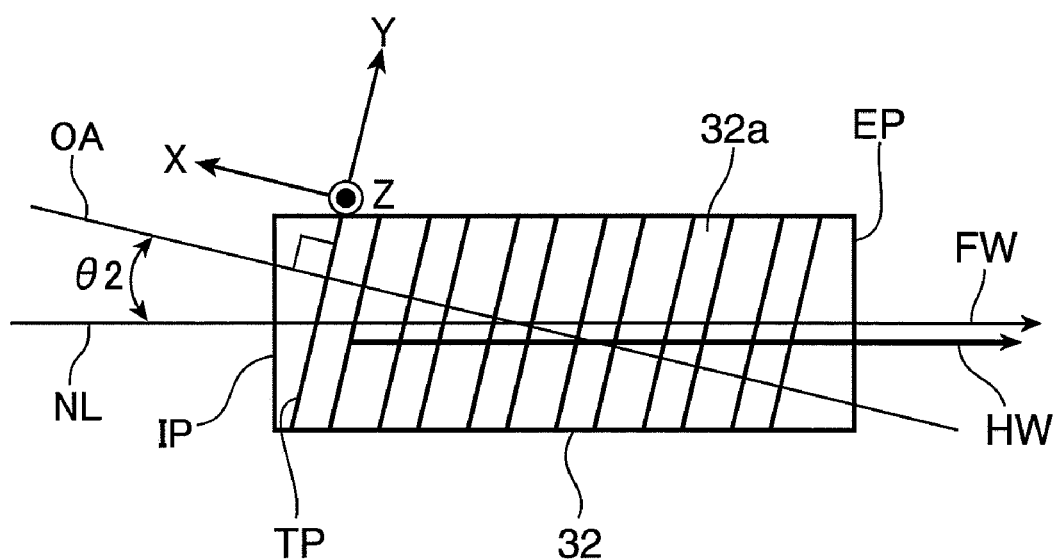
FIG. 9 is an enlarged view of a wavelength conversion element shown in FIG. 8.

FIG. 8 is a construction diagram of a short wavelength light source according to a fifth embodiment of the present invention. The short wavelength light source shown in FIG. 8 includes a fundamental wave light source 1, wavelength conversion elements 2, 32 and condensing optical systems 4, 5. FIG. 9 is an enlarged view of the wavelength conversion element 32 shown in FIG. 8.

In this embodiment, a phase difference is compensated by an angle formed between an incident end surface IP of the wavelength conversion element 32 and an end surface TP of a periodic polarization-inversion structure 32a in an incident part of the wavelength conversion element 32 instead of by a phase compensation plate. In other words, a phase difference can be compensated by setting an angle $\theta2$ as an angle formed between an optical axis OA of the periodic polarization-inversion structure 32a and a normal line NL to a substrate end surface (end surface of the incident part of the wavelength conversion element 32) to adjust the position of a beam with respect to the wavelength conversion element 32.

Specifically, the angle $\theta2$ formed between the optical axis OA of the periodic polarization-inversion structure 32a and the normal line NL to the incident end surface IP of the wavelength conversion element 32 preferably satisfies a relationship: $\theta2 < \lambda/(2 \times R2 \times \Delta n)/10$ (radian) when $\lambda$ denotes a wavelength of a fundamental wave FW, R2 a beam radius of the fundamental wave FW near the incident part of the wavelength conversion element 32 and $\Delta n$ a refractive index difference between the fundamental wave and a second harmonic in the wavelength conversion element 32, i.e. a nonlinear optical crystal. This is because a phase difference between the fundamental wave and the second harmonic generated in the wavelength conversion element 32 can be reduced to achieve high efficiency by setting the phase difference between the fundamental wave and the second harmonic to or below $\lambda/10$ in the beam.

Similar to the fourth embodiment, an angular displacement $\Delta\theta2$ of $\theta2$ needs to be controlled such that $\theta2$ is substantially smaller than $\lambda/(2 \times R4 \times \Delta n)/10$ with respect to a beam radius R4 on the end surface in order to compensate the phase difference between the fundamental wave and the second harmonic in beam plane. For example, in the case of MgLN, Δθ2 needs to be smaller than about 1/140 radian. The angle θ2 is preferably set at such a position where the beam diameter is small to relax angular accuracy and surface accuracy as can be understood from the relational expression of Δθ2. Accordingly, the angle θ2 as a phase compensating portion formed in the wavelength conversion element needs to be set at least in the emergent part of the wavelength conversion element 2 or in the incident part of the wavelength conversion element 32. The phase of the second harmonic can be matched by adjusting the position of the wavelength conversion element with respect to the fundamental wave beam.

Figure 10:
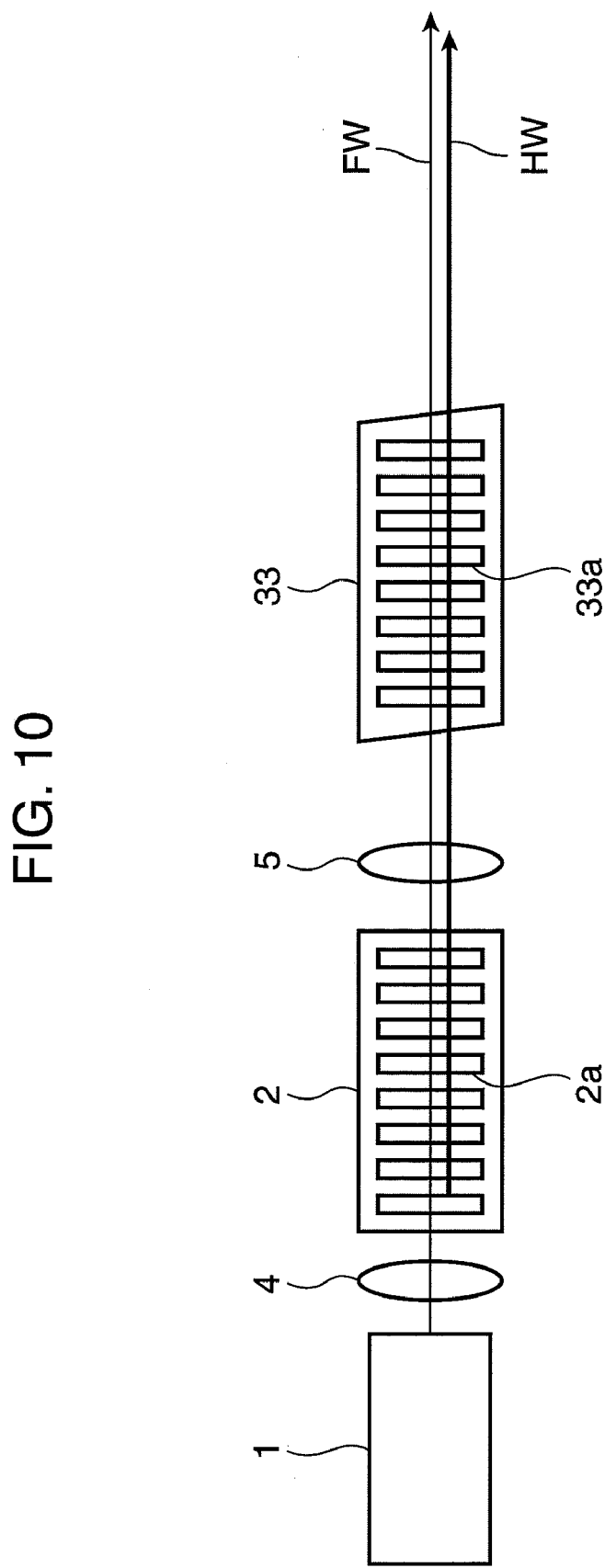
FIG. 10 is a diagram showing an exemplary construction of another short-wavelength light source according to the fifth embodiment of the invention.
Figure 11:
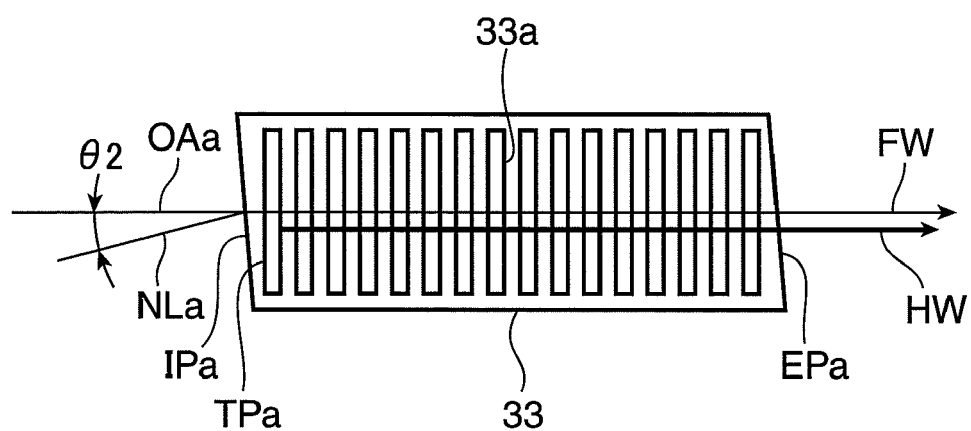
FIG. 11 is an enlarged view of a wavelength conversion element shown in FIG. 10.

Similar effects can be also obtained by inclining an incident end surface IPa of a wavelength conversion element 33 with respect to a periodic polarization-inversion structure 33a as shown in FIGS. 10 and 11 to set the angle θ2 as a phase compensating portion. FIG. 10 is a construction diagram of another short wavelength light source according to the fifth embodiment of the present invention. The short wavelength light source shown in FIG. 10 includes a fundamental wave light source 1, wavelength conversion elements 2, 33 and condensing optical systems 4, 5. FIG. 11 is an enlarged view of the wavelength conversion element 33 shown in FIG. 10.

As shown in FIGS. 10, 11, the incident end surface IPa and an emergent end surface EP of the wavelength conversion element 33 are inclined with respect to an optical axis OAa of a fundamental wave FW, and an end surface TPa of a periodic polarization-inversion structure 33a is perpendicular to the optical axis OAa of the fundamental wave FW. By inclining the incident end surface IPa of the wavelength conversion element 33 in this way, an angle θ2 formed between the optical axis OAa of the periodic polarization-inversion structure 33a and a normal line NLa to the incident end surface IPa of the wavelength conversion element 33 in the wavelength conversion element 33, i.e. nonlinear optical crystal preferably satisfies a relationship: $\theta 2 < \lambda/(2 \times R2 \times \Delta n)/10$ (radian) when λ denotes a wavelength of the fundamental wave FW, R2 a beam radius of the fundamental wave near the incident part of the wavelength conversion element 33 and Δn a refractive index difference between the fundamental wave and a second harmonic in the wavelength conversion element 33, i.e. nonlinear optical crystal. As a result, a phase difference between the fundamental wave and the second harmonic can be suppressed to or below λ/10 in the beam, a phase difference between the fundamental wave and the second harmonic generated in the wavelength conversion element 33 can be reduced to achieve high efficiency wavelength conversion.

As described above, in the short wavelength light sources shown in FIGS. 8 to 11, the number of parts can be reduced by eliminating the need for a phase compensation plate since an inclined portion as a phase compensating portion is provided on the end surface of the wavelength conversion element 32, 33. Further, the cross-sectional area of the fundamental wave beam is smaller on the element end surface than near the condensing optical system 5, wherefore the surface accuracy of the end surface for suppressing the phase difference between the fundamental wave and the second harmonic in the beam is relaxed and, hence, there is an advantage of making it easier to fabricate the wavelength conversion element.

Figure 12:
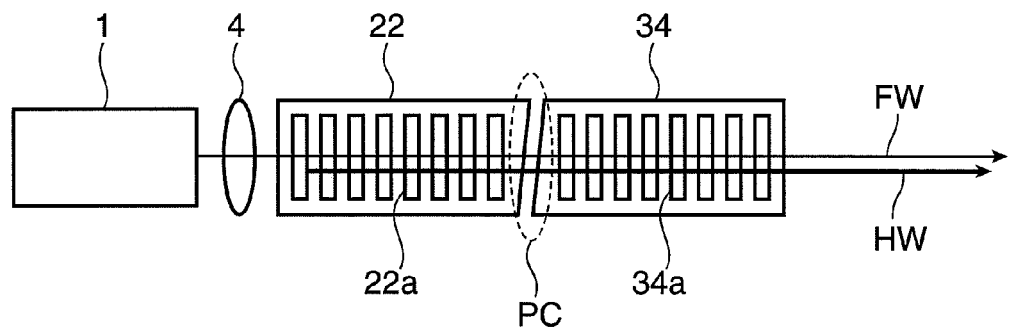
FIG. 12 is a diagram showing an exemplary construction of still another short-wavelength light source according to the fifth embodiment of the invention.
Figure 13:
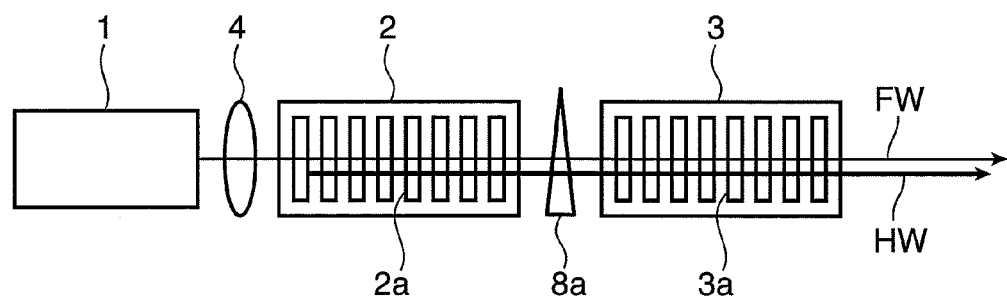
FIG. 13 is a diagram showing an exemplary construction of still another short-wavelength light source according to the fifth embodiment of the invention.

Both constructions shown in FIGS. 12 and 13 are also effective as the above inclined portion as the phase compensating portion. FIGS. 12 and 13 are construction diagrams showing other short wavelength light sources according to the fifth embodiment of the present invention.

The construction of FIG. 12 includes no condensing optical system between wavelength conversion elements 22, 34 and a single-path fundamental wave FW is wavelength-converted by the wavelength conversion elements 22, 34. Here, the wavelength conversion elements 22, 34 are made of different materials, and the wavelength conversion element 34 has a better high output resistance than the wavelength conversion element 22. The fundamental wave FW emitted from a fundamental wave light source 1 is wavelength-converted by the wavelength conversion element 22 and then wavelength-converted by the wavelength conversion element 34. A phase compensating portion PC is provided such that the phases of second harmonics generated in the two elements match, and phase compensation is performed in this part. The phase compensating portion PC is formed by displacing end surfaces of the wavelength conversion elements 22, 34 and those of periodic polarization-inversion structures 22a, 34a by a small angle as in FIGS. 8 to 11. As shown in FIG. 13, a phase difference can be similarly compensated by disposing a phase compensation plate 8a between wavelength conversion elements 2, 3. In these examples, the short wavelength light source can be miniaturized and stabilized since one condensing optical system can be eliminated.

In the construction shown in FIG. 12, the wavelength conversion elements 22, 34 may be directly bonded (or optically adhered). In this case, an optical loss can be eliminated by bonding. Further, since an optical distance is shortened, the spread of the beam can be suppressed to achieve high efficiency. Furthermore, a stable output can be obtained even upon a temperature change.

Sixth Embodiment

Figure 14:
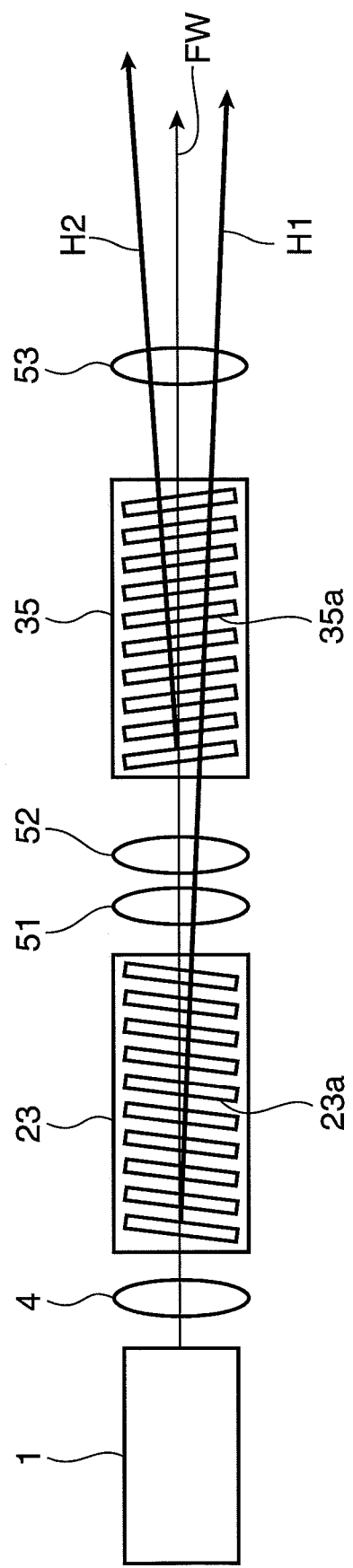
FIG. 14 is a diagram showing an exemplary construction of a short-wavelength light source according to a sixth embodiment of the invention.

In this embodiment is described a method for preventing beams of second harmonics generated in a plurality of wavelength conversion elements from overlapping to achieve a higher output in a construction for generating second harmonics by the plurality of wavelength conversion elements. FIG. 14 is a construction diagram of another short wavelength light source according to a sixth embodiment of the present invention. The short wavelength light source shown in FIG. 14 includes a fundamental wave light source 1, wavelength conversion elements 23, 35 and condensing optical systems 4, 51 to 53.

Figure 15:
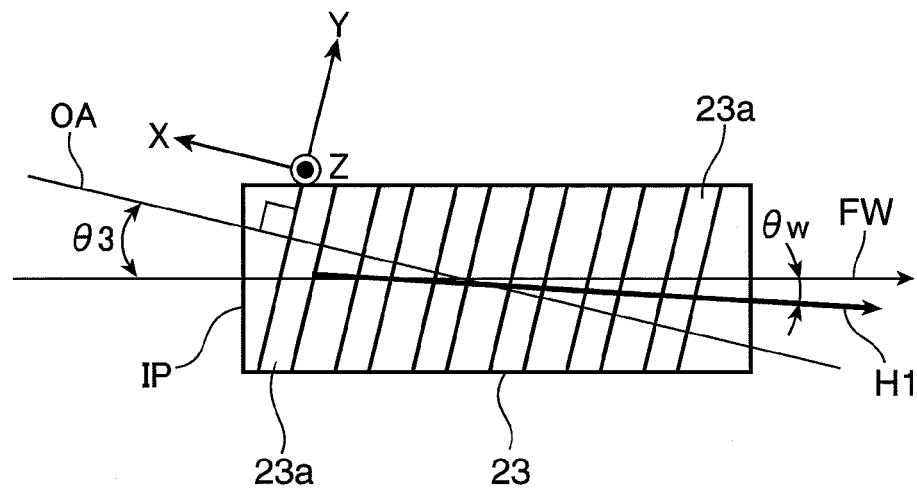
FIG. 15 is an enlarged view of a wavelength conversion element shown in FIG. 14.

In FIG. 14, a fundamental wave FW has a part thereof converted into a second harmonic H1 by the wavelength conversion element 23 after being condensed by the condensing optical system 4, another part thereof is converted into a second harmonic H2 by the wavelength conversion element 35 after being condensed by the condensing optical systems 51, 52, and the converted second harmonics H1, H2 are condensed by the condensing optical system 53. Periodic polarization-inversion structures 23a, 35a in the wavelength conversion elements 23, 35 are inclined with respect to an optical axis of the fundamental wave FW. For specific description, the wavelength conversion element 23 shown in FIG. 14 is enlargedly shown in FIG. 15. The wavelength conversion element 35 is constructed similar to the wavelength conversion element 23 except that an inclining direction is changed from the one toward a right upper side to the one toward a right lower side and a material is different.

In the wavelength conversion element 23 shown in FIG. 14, it is assumed that a perpendicular to the periodic polarization-inversion structure 23a is an optical axis OA and of the periodic polarization-inversion structure 23a and an angle formed between the optical axis OA and the optical axis of the fundamental wave FW is a polarization-inversion angle θ3. Unless θ3 is 0, a walk-off angle θw occurs due to a dispersion characteristic of the fundamental wave and the second harmonic, and the second harmonic H1 is generated in a propagation direction different from that of the fundamental wave FW. The wavelength conversion element 35 similarly functions, and the second harmonic H2 is generated in a propagation direction different from that of the fundamental wave FW.

Accordingly, as shown in FIG. 14, if different polarization-inversion angles, e.g. a downward facing polarization-inversion angle and an upward facing polarization-inversion angle, are formed in the wavelength conversion elements 23, 35, the second harmonics H1, H2 are generated in mutually different optical axis directions, wherefore a plurality of second harmonics whose beams do not overlap can be generated.

As a result, the power density of the second harmonic is reduced to improve a high output resistance. Further, since the optical axes of the fundamental wave and the second harmonic are displaced due to walk-off, the overlap of the fundamental wave and the second harmonic is reduced to suppress the generation of the sum frequency. Furthermore, since the walk-off angle between the sum frequency and the fundamental wave also increases, the generation of the sum frequency is further suppressed. The high output resistance is remarkably improved by these three effects.

What is important here is the beam quality of the fundamental wave FW after passing the wavelength conversion element 23. If a second harmonic of 2 W or higher was generated using PPMgLN for the wavelength conversion element 23, such a phenomenon was observed in which the beam quality of a fundamental wave was deteriorated due to a thermal lens generated by the absorption of a second harmonic caused by the generation of a sum frequency even in a state where a stable output could be obtained and conversion efficiency in the wavelength conversion element 35 was reduced.

In order to prevent this, the second harmonic generated in the wavelength conversion element 23 needs to be reduced to or below 2 W, which has, however, caused a problem of considerably reducing the entire output. Accordingly, PPMgLT having a strong high output resistance was used for the wavelength conversion element 23. Since PPMgLT has a high terminal conductivity and little absorbs ultraviolet rays, the absorption of visible light to be excited by the sum frequency is unlikely to occur and, even upon the occurrence of visible light absorption, a temperature change is suppressed to a lower level. Therefore, a special effect of being able to reduce the disturbance of a wavefront even if a high output green light is generated can be obtained.

Based on this result, the beam quality of the fundamental wave FW after passing the wavelength conversion element 23 can be ensured to enable high efficiency and high-output wavelength conversion by using PPMgLT for the wavelength conversion element 23 and PPMgLN for the wavelength conversion element 35 to perform wavelength conversion by different crystals in this embodiment.

Seventh Embodiment

Figure 16:
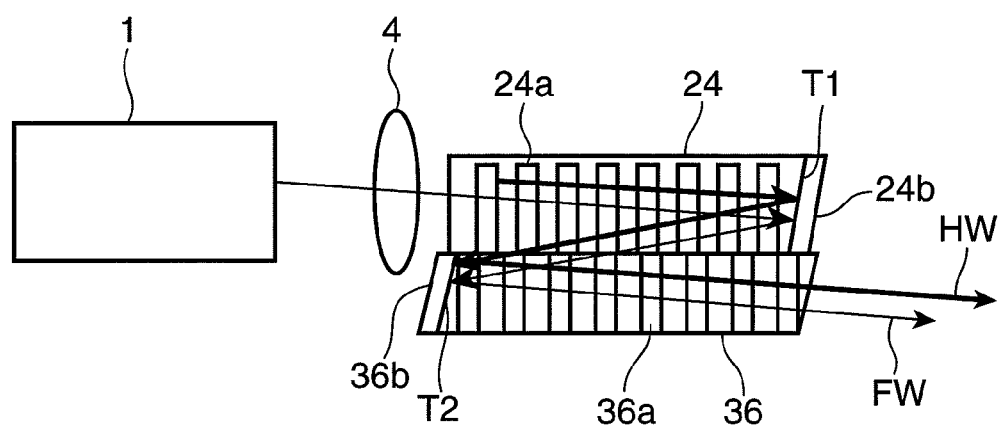
FIG. 16 is a diagram showing an exemplary construction of a short-wavelength light source according to a seventh embodiment of the invention.

In this embodiment is described a short wavelength light source for performing wavelength conversion in a zigzag path by overlapping a plurality of wavelength conversion elements. FIG. 16 is a construction diagram of a short wavelength light source according to a seventh embodiment of the present invention. The short wavelength light source shown in FIG. 16 includes a fundamental wave light source 1, wavelength conversion elements 24, 36 and a condensing optical system 4. The wavelength conversion elements 24, 36 are vertically arranged one above the other in two levels. Reflection films 24b, 36b for reflecting a fundamental wave and a second harmonic are so formed on end surfaces T1, T2 of the wavelength conversion elements 24, 36 as to be inclined with respect to optical axes of the fundamental wave and the second harmonic.

As shown in FIG. 16, a fundamental wave emitted from the fundamental wave light source 1 is reflected by the end surface T1 of the wavelength conversion element 24 after being wavelength-converted into a second harmonic by the wavelength conversion element 24. The fundamental wave reflected by the end surface T1 is wavelength-converted into a second harmonic by the wavelength conversion element 36 after being reflected by the end surface T2 of the wavelength conversion element 36. During this time, the second harmonics wavelength-converted by the wavelength conversion elements 24, 36 are added to generate a high-output second harmonic HW.

Since the power of the second harmonic increases as the light propagates in this way, PPMgLN having a large nonlinear optical constant was used for the wavelength conversion element 24 closer to an incident end and PPMgLT having a low nonlinear optical constant, but a strong high output resistance was used for the wavelength conversion element 36 closer to an emergent end. In this way, high efficiency and higher output can be achieved by using the material having a strong high output resistance for the wavelength conversion element 36 closer to the emergent end in this embodiment.

Further, in order to match the phases of the second harmonics generated in the respective elements, the end surfaces T1, T2 of the wavelength conversion elements 24, 36 are slightly inclined with respect to periodic polarization-inversion structures 24a, 36a. As a result, in this embodiment, a phase difference between the second harmonics generated in the wavelength conversion elements 24, 36 can be reduced to achieve high efficiency.

Figure 17:
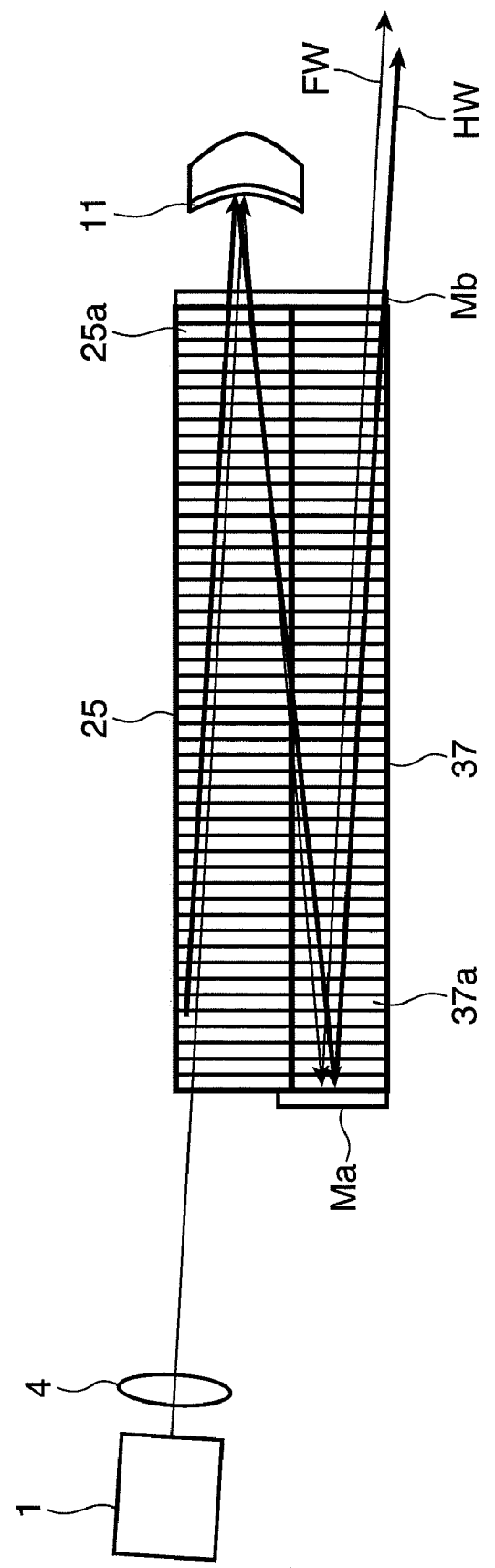
FIG. 17 is a diagram showing an exemplary construction of another short-wavelength light source according to the seventh embodiment of the invention.

Further, in order to reflect the fundamental wave and the second harmonic, a construction for condensing light using a concave mirror 11 as shown in FIG. 17 may be adopted. FIG. 17 is a construction diagram of another short wavelength light source according to the seventh embodiment of the present invention. The short wavelength light source shown in FIG. 17 includes a fundamental wave light source 1, wavelength conversion elements 25, 37, a condensing optical systems 4 and the concave mirror 11. The wavelength conversion elements 25, 37 are vertically arranged one above the other in two levels. A multilayer film Ma for reflecting a fundamental wave and a second harmonic is formed on an end surface of the wavelength conversion element 37 toward the fundamental wave light source 1, and a multilayer film Mb for transmitting the fundamental wave and the second harmonic is formed on end surfaces of the wavelength conversion elements 25, 37 toward the concave mirror 11.

In the construction shown in FIG. 17 as well, a material having a stronger high output resistance than that of the wavelength conversion element 25 is used for the wavelength conversion element 37 closer to the emergent end. In this example, the concave mirror 11 is used as a reflection mirror and the fundamental wave is condensed by the concave mirror 11 to increase the power density in the crystal of the wavelength conversion element 37, wherefore conversion efficiency is improved. Further, since no color aberrations of the fundamental wave and the second harmonic occur, a phase displacement of the second harmonic generated in the crystal can be suppressed.

Figure 18:
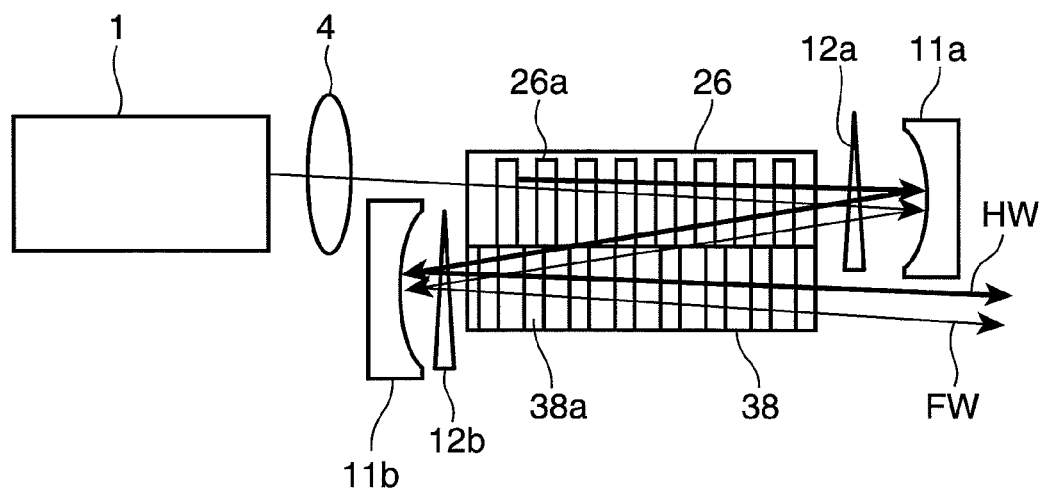
FIG. 18 is a diagram showing an exemplary construction of still another short-wavelength light source according to the seventh embodiment of the invention.

Alternatively, in order to reflect the fundamental wave and the second harmonic, a construction for condensing light using concave mirrors 11a, 11b and the phases of second harmonics are adjusted by phase compensation plates 12a, 12b as shown in FIG. 18 may be adopted. FIG. 18 is a construction diagram of still another short wavelength light source according to the seventh embodiment of the present invention. The short wavelength light source shown in FIG. 18 includes a fundamental wave light source 1, wavelength conversion elements 26, 38, a condensing optical system 4, the concave mirrors 11a, 11b and the phase compensation plates 12a, 12b. The wavelength conversion elements 26, 38 are vertically arranged one above the other in two levels. The phase compensation plate 12a and the concave mirror 11a are arranged at a side of the wavelength conversion element 26 opposite to the fundamental wave light source 1, and the phase compensation plate 12b and the concave mirror 11b are arranged at a side of the wavelength conversion element 38 toward the fundamental wave light source 1. In the construction shown in FIG. 18 as well, a material having a stronger high output resistance than that of the wavelength conversion element 26 is used for the wavelength conversion element 38 closer to the emergent end.

In the construction for wavelength-converting light by the wavelength conversion elements 26, 38 while reflecting it by the concave mirrors 11a, 11b as shown in FIG. 18, the phases of second harmonics generated in beam paths can be matched by adjusting the phases of the second harmonics by the phase compensation plates 12a, 12b, wherefore high efficiency can be achieved. In other words, in such a reflecting construction, the phases of the second harmonics need to be adjusted in the case of re-incidence on the wavelength conversion elements 26, 38 and such adjustments are enabled by providing the phase compensation plates 12a, 12b to achieve high efficiency.

By adopting a reflecting construction as in the above respective examples, high efficiency wavelength conversion is possible in a short optical path, thereby promoting miniaturization. Further, by using different materials for the wavelength conversion elements, the high output resistance can be improved. Although the cases of using the two wavelength conversion elements in the reflecting construction are described, three or more wavelength conversion elements may be arranged one above another in a thickness direction. Alternatively, wavelength conversion may be performed a plurality of times in one wavelength conversion element.

Eight Embodiment

Figure 19:
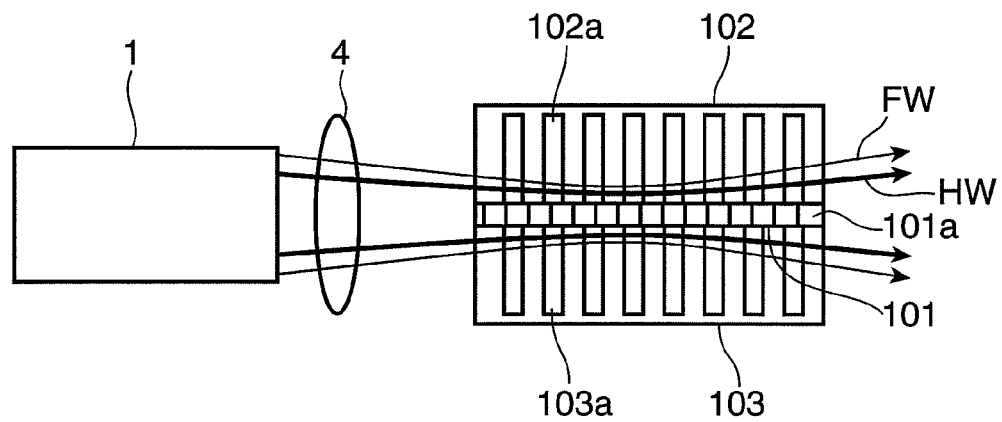
FIG. 19 is a diagram showing an exemplary construction of a short-wavelength light source according to an eighth embodiment of the invention.

In this embodiment, a construction in which a plurality of wavelength conversion elements are bonded (or optically adhered) in a thickness direction is described with reference to FIG. 19. FIG. 19 is a construction diagram of a short wavelength light source according to an eighth embodiment of the present invention. The short wavelength light source shown in FIG. 19 includes a fundamental wave light source 1, wavelength conversion elements 101 to 103 and a condensing optical system 4. The wavelength conversion elements of this embodiment are arranged such that the wavelength conversion element 101 is sandwiched between the wavelength conversion elements 102, 103.

A fundamental wave FW emitted from the fundamental wave light source 1 is so condensed by the condensing optical system 4 as to have a focal point in the wavelength conversion elements 101 to 103. The thickness of the wavelength conversion element 101 is designed to be thinner than a beam diameter so that a beam transverses the plurality of wavelength conversion elements 101 to 103.

Here, a thermal lens by the absorption of a second harmonic is generated in a beam center where the power density of the beam is large. In order to suppress this, a crystal having a larger thermal conductivity than crystals of the wavelength conversion elements 102, 103 is used for the wavelength conversion element 101 located in the beam center.

For example, PPMgLT or PPMgLT including stoichiometric Mg-doped LiTaO$_3$ is used for the wavelength conversion element 101, and PPMgLN having high conversion efficiency is used for the wavelength conversion elements 102, 103. In this case, the generation of the thermal lens can be suppressed and a light source having a strong high output resistance can be realized since the crystal having a larger thermal conductivity is used in the central part. Further, since the respective crystals constituting the wavelength conversion elements 101 to 103 are directly bonded to each other, air layers between bonded surfaces can be eliminated to suppress the disturbance of the beam wavefront.

Figure 20:
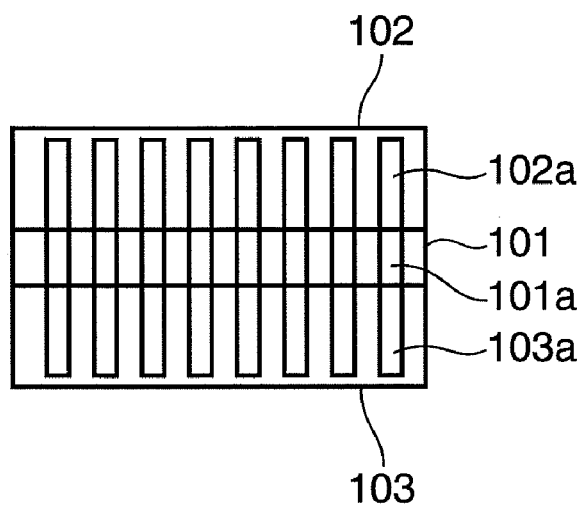
FIG. 20 is an enlarged view of an exemplary wavelength conversion element shown in FIG. 19.
Figure 21:
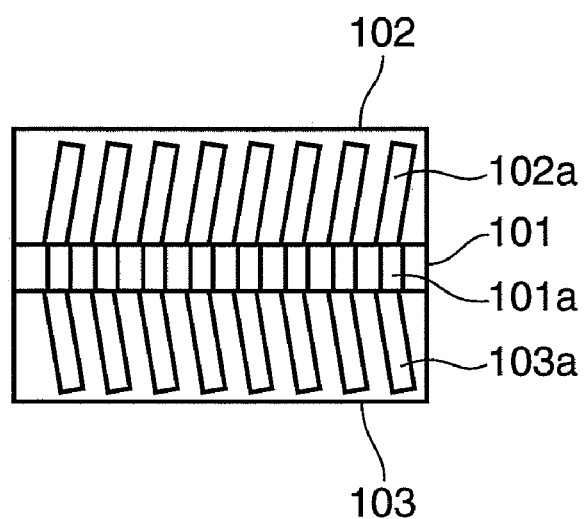
FIG. 21 is an enlarged view of another exemplary wavelength conversion element shown in FIG. 19.

In the case of bonding the wavelength conversion elements, a construction for inclining periodic polarization-inversion structures 102a, 103a of the wavelength conversion elements 102, 103 arranged at the opposite sides with respect to a propagation direction of a beam as shown in FIG. 21 is also effective in addition to a construction for bonding surfaces perpendicular to periodic polarization-inversion structures 101a to 103a as shown in FIG. 20. In this case, since the dispersion of second harmonics generated at the both sides is suppressed and the second harmonic beams are concentrated in the center by inclining the periodic polarization-inversion structures 102a, 103a, conversion efficiency can be improved.

Although the construction for bonding the three wavelength conversion elements in a cross-sectional direction of the beam is described, more crystals may be bonded. It is also possible to sandwich a material other than the wavelength conversion element in the central part of the beam. A material transparent in response to the fundamental wave and the second harmonic and having a large thermal conductivity is preferably used in this case. Further, instead of placing a plurality of wavelength conversion elements one above another, a plurality of wavelength conversion elements may enclose one wavelength conversion element.

Ninth Embodiment

Figure 22:
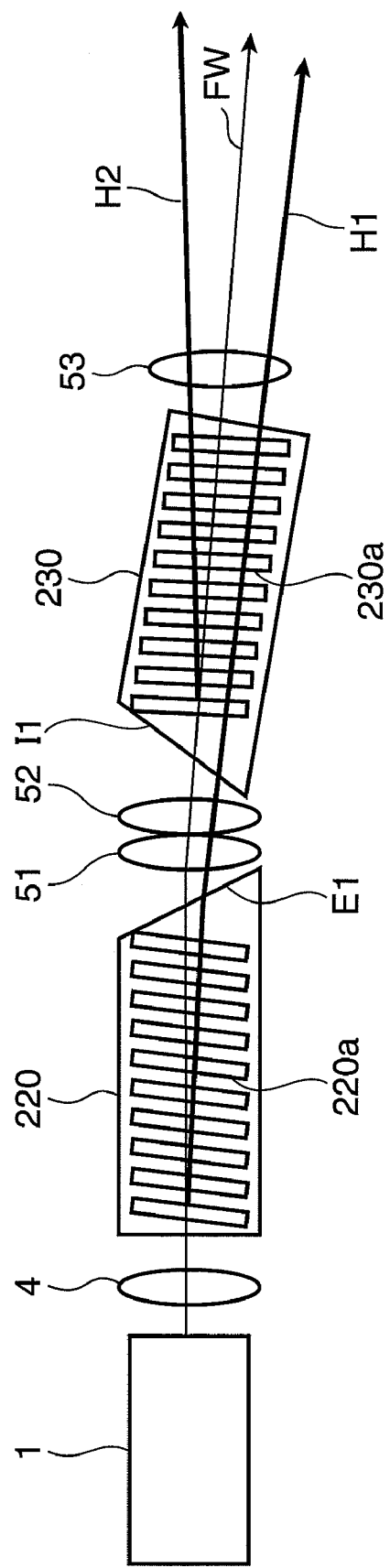
FIG. 22 is a diagram showing an exemplary construction of a short-wavelength light source according to a ninth embodiment of the invention.

FIG. 22 is a construction diagram of a short wavelength light source according to a ninth embodiment of the present invention. The short wavelength light source shown in FIG. 22 includes a fundamental wave light source 1, wavelength conversion elements 220, 230 and condensing optical systems 4, 51 to 53. The construction shown in FIG. 22 is effective as another method for improving a high output resistance.

As shown in FIG. 22, periodic polarization-inversion structures 220a, 230a of the wavelength conversion elements 220, 230 are formed oblique to an optical axis of a fundamental wave FW, an emergent surface E1 of the wavelength conversion element 220 has an oblique angle and an incident surface I1 of the wavelength conversion element 230 has an oblique angle.

If the incident and emergent surfaces I1, E1 are obliquely formed in this way, an angle difference between the fundamental wave and a second harmonic is increased by a prism effect. Since this enables optical axes of two second harmonics H1, H2 in the wavelength conversion element 230 to be displaced, the overlap can be reduced to improve a high output resistance.

Figure 23:
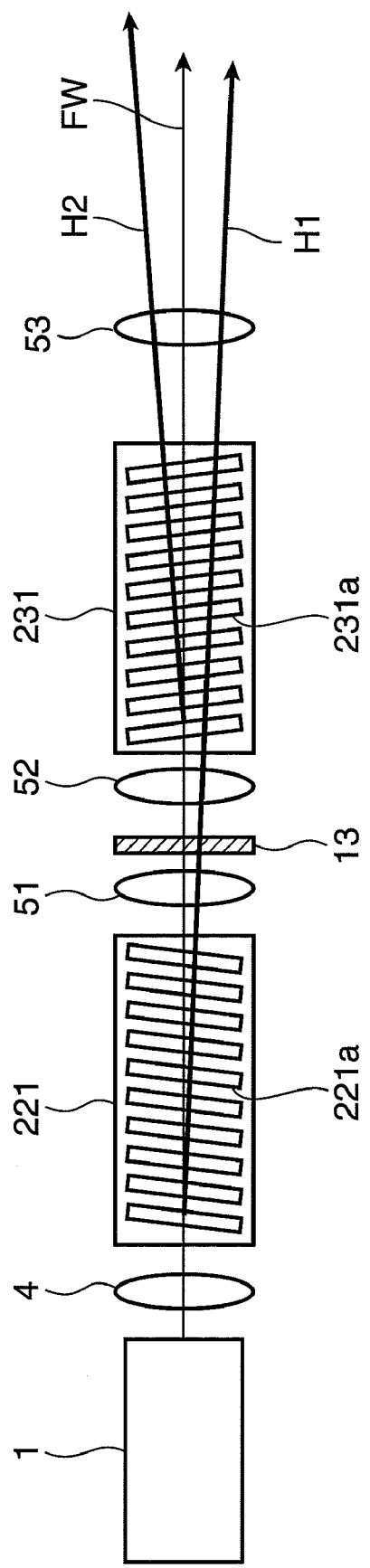
FIG. 23 is a diagram showing an exemplary construction of another short-wavelength light source according to the ninth embodiment of the invention.

In order to displace the optical axes of the second harmonics H1, H2, a construction using a polarizing plate without obliquely forming incident and emergent surfaces of wavelength conversion elements as shown in FIG. 23 may be adopted. FIG. 23 is a construction diagram of another short wavelength light source according to the ninth embodiment of the present invention. A polarizing plate 13 shown in FIG. 23 preferably has such a characteristic of rotating only the polarization of the second harmonic without rotating that of the fundamental wave. In this case, a second harmonic H1 generated in a wavelength conversion element 221 has a polarization different from that of a fundamental wave FW in a wavelength conversion element 231 by inserting the polarizing plate 13 between condensing optical systems 51, 52.

As a result, in this example, the generation of a sum frequency in the wavelength conversion element 231 can be suppressed to remarkably improve the high output resistance by differentiating polarization directions of the fundamental wave FW and the second harmonic H1. Since the generation of the sum frequency is minimized in the case where the polarizations of the second harmonic and the fundamental wave are orthogonal to each other, the characteristic of the polarizing plate 13 is preferably set such that the polarizations of the second harmonic and the fundamental wave are orthogonal to each other.

What is important here is the beam quality of the fundamental wave FW after passing the wavelength conversion element 220 (or the wavelength conversion element 221). If a second harmonic of 2 W or higher was generated using PPMgLN for the wavelength conversion element 220 (or the wavelength conversion element 221), such a phenomenon was observed in which the beam quality of a fundamental wave was deteriorated due to a thermal lens generated by the absorption of a second harmonic caused by the generation of a sum frequency even in a state where a stable output could be obtained and conversion efficiency in the wavelength conversion element 230 (or the wavelength conversion element 231) was reduced.

In order to prevent this, the second harmonic generated in the wavelength conversion element 220 (or the wavelength conversion element 221) needs to be reduced to or below 2 W, which has, however, caused a problem of considerably reducing the entire output. Accordingly, PPMgLT having a strong high output resistance was used for the wavelength conversion element 220 (or the wavelength conversion element 221). Since PPMgLT has a high terminal conductivity and little absorbs ultraviolet rays, the absorption of visible light to be excited by the sum frequency is unlikely to occur and, even upon the occurrence of visible light absorption, a temperature change is suppressed to a lower level. Therefore, a special effect of being able to reduce the disturbance of a wavefront even if a high output green light is generated can be obtained.

Based on this result, the beam quality of the fundamental wave FW after passing the wavelength conversion element 220 (or the wavelength conversion element 221) can be ensured to enable high efficiency and high-output wavelength conversion by using PPMgLT for the wavelength conversion element 220 (or the wavelength conversion element 221) and PPMgLN for the wavelength conversion element 230 (or the wavelength conversion element 231) to perform wavelength conversion by different crystals in this embodiment.

Although PPMgLT having a large thermal conductivity is used as an element having a good high output resistance in this embodiment, a stoichiometric crystal of Mg-doped LiTaO$_3$ formed with a periodic polarization-inversion structure, crystals of KTP, LBO can also be used.

Figure 24:
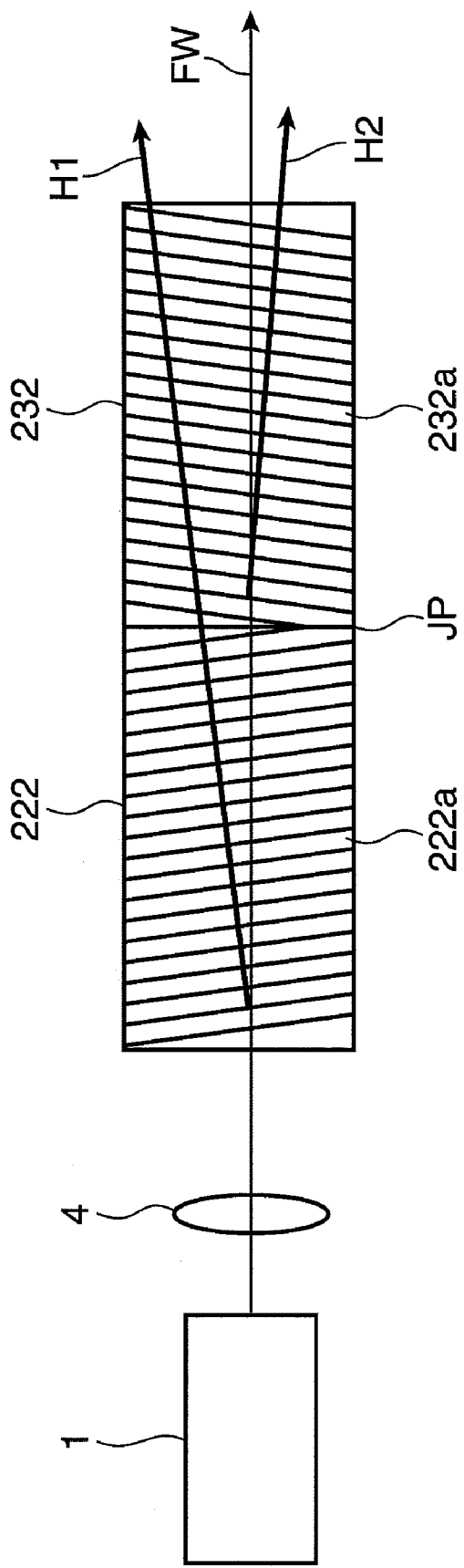
FIG. 24 is a diagram showing an exemplary construction of still another short-wavelength light source according to the ninth embodiment of the invention.

In order to displace the optical axes of the second harmonics H1, H2, a construction designed for miniaturization as shown in FIG. 24 may be adopted. FIG. 24 is a construction diagram of still another short wavelength light source according to the ninth embodiment of the present invention. The short wavelength light source shown in FIG. 24 includes a fundamental wave light source 1, wavelength conversion elements 222, 232 and a condensing optical system 4.

In the short wavelength light source shown in FIG. 24, a first region and a second region having different polarization-inversion angles θ3 (see FIG. 14) are formed as wavelength conversion elements in one substrate, wherein the first region serves as the wavelength conversion element 222 and the second region serves as the wavelength conversion element 232. The first region, i.e. the wavelength conversion element 222 is made of a crystal having a large thermal conductivity, the second region, i.e. the wavelength conversion element 232 is made of a crystal having high conversion efficiency, and an optical axis of a periodic polarization-inversion structure 222a of the wavelength conversion element 222 and that of a periodic polarization-inversion structure 232a of the wavelength conversion element 232 cross an optical axis of a fundamental wave FW at different angles. Accordingly, second harmonics H1, H2 are generated with different walk-off angles in the respective regions.

As a result, in the example, the generation of a sum frequency can be suppressed by a reduction in the power density of the second harmonic and a reduction in the overlap of the second harmonic and the fundamental wave, wherefore a high output resistance can be remarkably improved. Since the two wavelength conversion elements 222, 232 are formed in one crystal, it is effective for miniaturization. It is also possible to connect a plurality of regions having different polarization-inversion angles θ3 in parallel and, in this case, an interaction length can be increased to achieve higher outputs.

Figure 25:
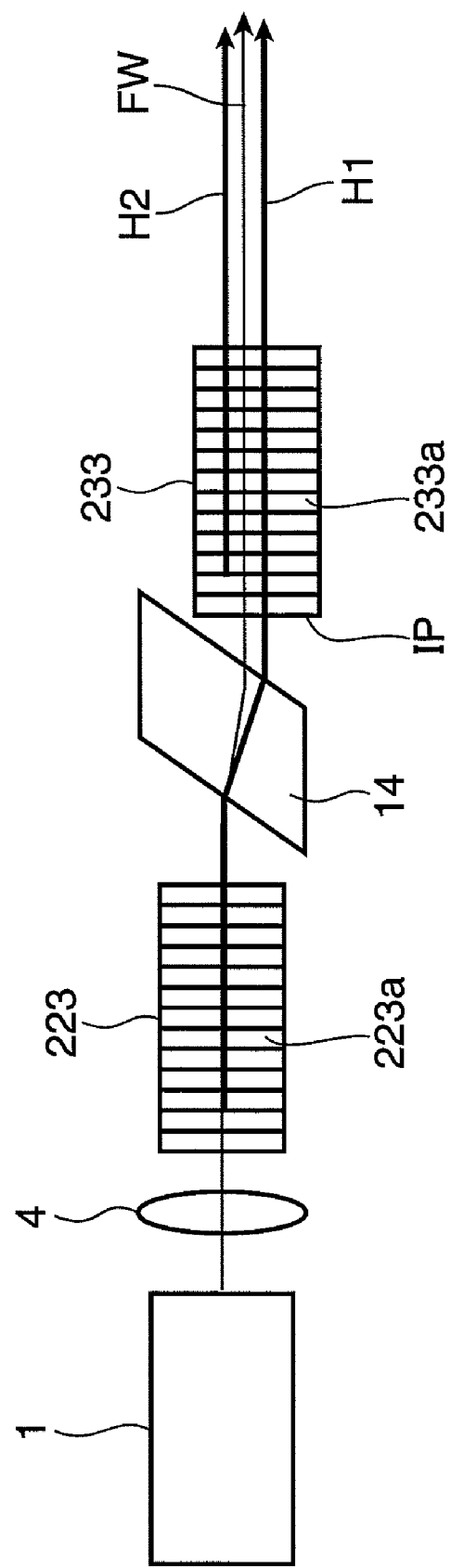
FIG. 25 is a diagram showing an exemplary construction of still another short-wavelength light source according to the ninth embodiment of the invention.

In order to displace optical axes of the second harmonics H1, H2, it is also effective to insert a prism 14 between the two wavelength conversion elements 223, 233, i.e. between the periodic polarization-inversion structures 223a, 233a as shown in FIG. 25. FIG. 25 is a construction diagram of still another short wavelength light source according to the ninth embodiment of the present invention.

Since angles of refraction of the fundamental wave and the second harmonics can be changed by a dispersion characteristic of the prism 14 in the short wavelength light source shown in FIG. 25, the second harmonic H1 outputted from the wavelength conversion element 223 and the fundamental wave FW outputted from the wavelength conversion element 223 can be separated in the wavelength conversion element 233. As a result, the high output resistance can be improved since the second harmonic H1 outputted from the wavelength conversion element 223 and the second harmonic H2 generated in the wavelength conversion element 233 can be separated.

Figure 26:
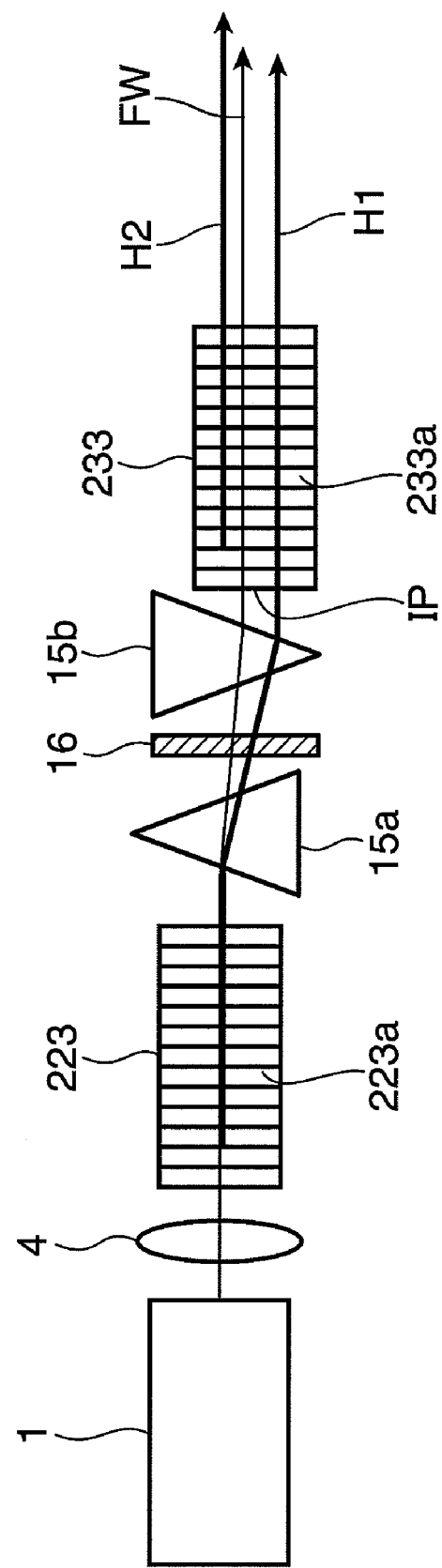
FIG. 26 is a diagram showing an exemplary construction of still another short-wavelength light source according to the ninth embodiment of the invention.

In order to displace optical axes of the second harmonics H1, H2, it is also effective to insert a polarizing plate 16 between two prisms 15a, 15b as shown in FIG. 26. FIG. 26 is a construction diagram of still another short wavelength light source according to the ninth embodiment of the present invention.

In the short wavelength light source shown in FIG. 26, the two prisms 15a, 15b function similar to the prism 14 shown in FIG. 25, and the polarizing plate 16 is disposed between the two prisms 15a, 15b. Similar to the polarizing plate 13 shown in FIG. 23, the polarizing plate 16 preferably has such a characteristic of rotating only the polarization of the second harmonic without rotating that of the fundamental wave.

Since the polarizations of the second harmonic H1 and the fundamental wave FW can be differentiated by rotating the polarization of the second harmonic H1 by the polarizing plate 16 in this example, the generation of a sum frequency by the second harmonic H1 and the fundamental wave FW in the wavelength conversion element 233 can be suppressed to further increase the high output resistance.

It is effective to separate the second harmonic generated in the wavelength conversion element 233 and the fundamental wave in different optical paths using the parallel prism 14 or a prism pair (prisms 15a, 15b) as shown in FIGS. 25 and 26. If a prism having a large wavelength dispersion is used, taking advantage of a difference between the wavelength of the fundamental wave and that of the second harmonic, the fundamental wave and the second harmonic can be separated due to a difference in angle of refraction.

If a parallel prism or a prism pair is used, it is also possible to make the fundamental wave and the second harmonic parallel lights having different optical paths. In this case, there is an advantage of simplifying an optical system for multiplexing two lights since the second harmonics H1, H2 can be extracted as lights substantially parallel to each other by making them parallel lights.

Instead of the prism pair, an optical system having a large dispersion of refractive index may be used. In this case as well, the second harmonic generated in the wavelength conversion element 223 and the fundamental wave can be separated in the wavelength conversion element 233, wherefore the high output resistance can be improved. A point in this case is to suppress the generation of the sum frequency in the wavelength conversion element 233 by separating the second harmonic generated in the wavelength conversion element 223 and the fundamental wave in the wavelength conversion element 233.

Besides the prism 14 shown in FIG. 25, a lens made of an optical glass having a large dispersion of refractive index is, for example, also effective as an optical element having a large dispersion of refractive index. Here, in the case of condensing the fundamental wave emitted from the wavelength conversion element 223 in the wavelength conversion element 233, a sum frequency occurring with high efficiency at a focal point where power density is high can be remarkably reduced by displacing focal spots of the fundamental wave FW and the second harmonic H1.

This displacement of the focal spots results from a difference in the refractive index of the lens depending on difference in the wavelength of the fundamental wave and that of the second harmonic and is preferably larger than a depth of focus at the focal point. It is also effective to separate the fundamental wave and the second harmonic by a grating element. Further, a grating lens formed by applying grating on the outer surface of a lens is effective since having a large wavelength dispersion.

Figure 27:
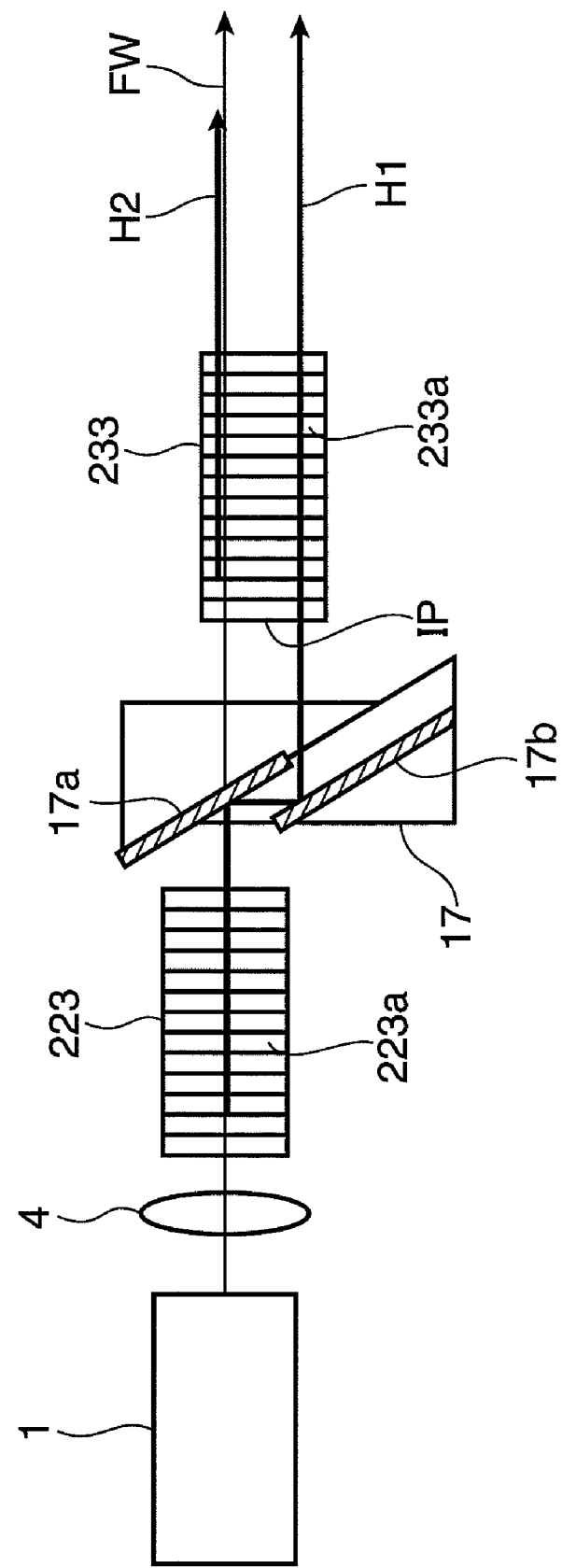
FIG. 27 is a diagram showing an exemplary construction of still another short-wavelength light source according to the ninth embodiment of the invention.

In order to displace optical axes of the second harmonics H1, H2, a separating prism 17 for separating the fundamental wave and the second harmonic as shown in FIG. 27 is also effective. FIG. 27 is a construction diagram of still another short wavelength light source according to the ninth embodiment of the present invention.

In the short wavelength light source shown in FIG. 27, the separating prism 17 includes a wavelength separating film 17a and a reflection film 17b, wherein the wavelength separating film 17a separates the fundamental wave FW and the second harmonic H1 and the reflection film 17b reflects the second harmonic H1. Since the separating prism 17 separates the light paths of the fundamental wave FW and the second harmonic H1 in this way, the fundamental wave FW and the second harmonic H1 can be separated in the wavelength conversion element 233 in this example as well, wherefore the high output resistance can be remarkably improved by suppressing the generation of the sum frequency.

Figure 28:
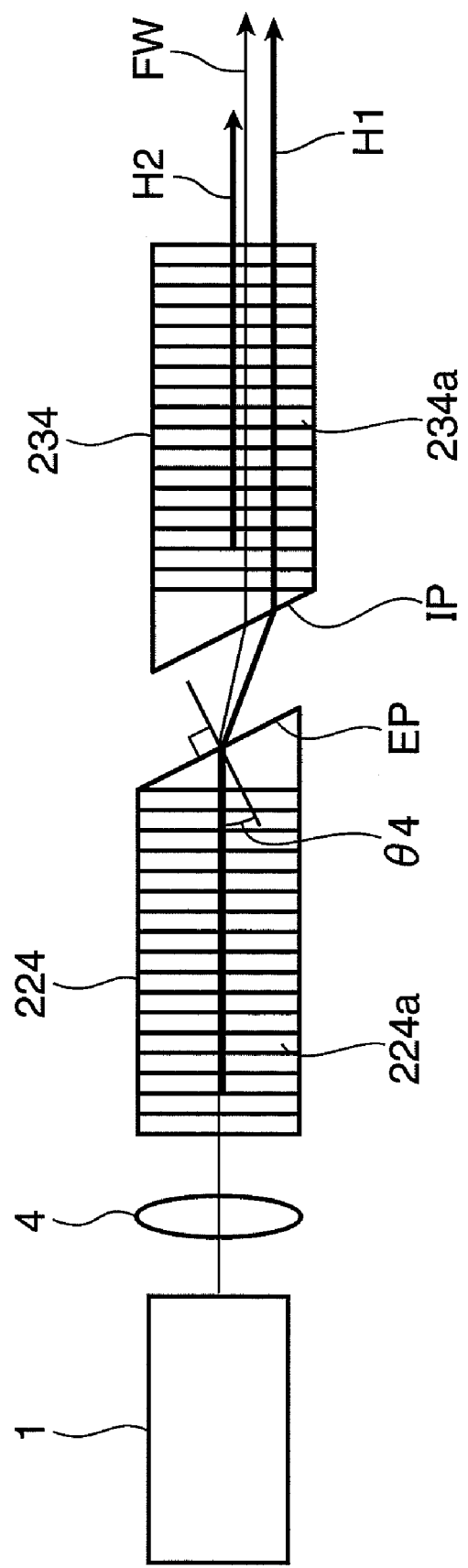
FIG. 28 is a diagram showing an exemplary construction of still another short-wavelength light source according to the ninth embodiment of the invention.
Figure 29:
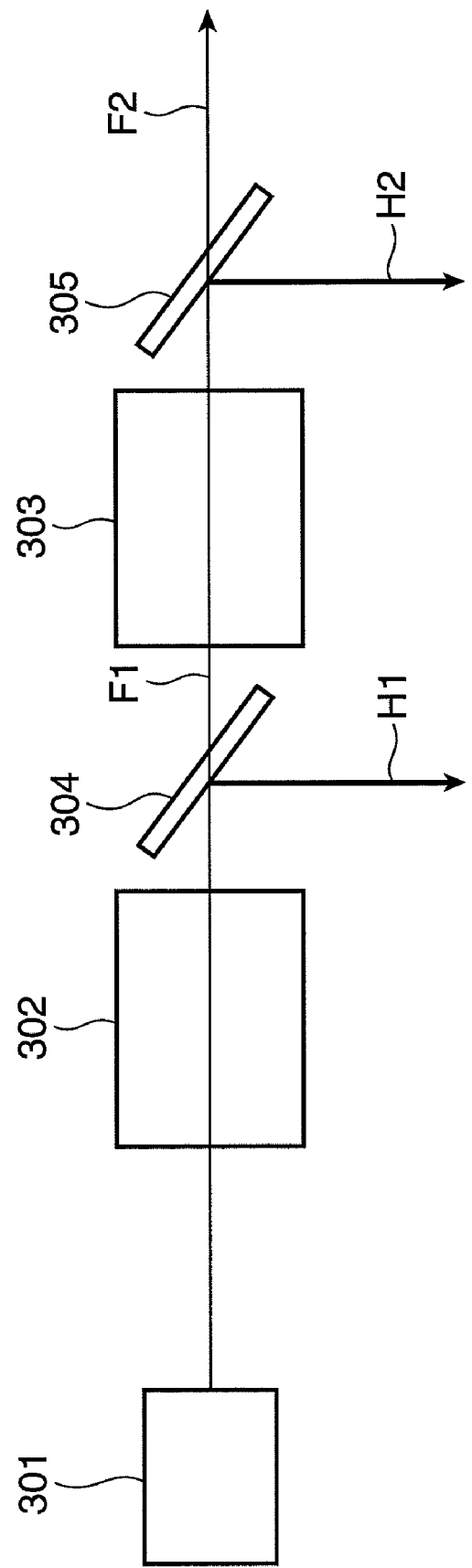
FIG. 29 is a diagram showing an exemplary construction of a conventional short wavelength light source.

In order to displace optical axes of the second harmonics H1, H2, it is also effective to incline an emergent surface EP of a wavelength conversion element 224 with respect to the beam of the fundamental wave FW. FIG. 28 is a construction diagram of still another short wavelength light source according to the ninth embodiment of the present invention.

In the short wavelength light source shown in FIG. 28, the emergent surface EP of the wavelength conversion element 224 is obliquely formed. As a result, emergence angles of the fundamental wave FW and the second harmonic H1 differ due to a refractive index difference caused by a difference between the wavelength of the fundamental wave FW and that of the second harmonic H1 and, taking advantage of this, the fundamental wave FW and the second harmonic H1 can be separated. Therefore, an end of the wavelength conversion element 224 can be utilized as a prism.

For example, if θ4 denotes an angle formed between the fundamental wave FW in the wavelength conversion element 224 and a perpendicular to the emergent surface EP, the optical paths of the fundamental wave FW and the second harmonic H1 are distanced by about 100 μm in a wavelength conversion element 234 when θ4 is 65° and a distance between the wavelength conversion elements 224, 234 is 1 mm. Thus, the high output resistance can be remarkably improved by suppressing the generation of the sum frequency.

Here, the value of θ4 is preferably 10° or larger to ensure a sufficient angle difference between the fundamental wave FW and the second harmonic H1 emitted from the emergent surface EP. θ4 is preferably 30° or smaller since the fundamental wave FW and the second harmonic H1 are totally reflected if the angle is large. It is more preferable to set θ4 to a Brewster angle since a reflection loss at the end surface is eliminated without applying anti-reflection coating.

An incident surface IP of the wavelength conversion element 234 is preferably set to the same angle as the emergent surface EP. By setting the same angle, the second harmonic H1 and the second harmonic H2 generated in the wavelength conversion element 234 become parallel in the wavelength conversion element 234, wherefore there is an advantage of simplifying an optical system for multiplexing the emergent lights. Further, conversion efficiency can be further improved by inserting a lens optical system between the two wavelength conversion elements 224, 234 to condense the fundamental wave again in the wavelength conversion element 234.

In the constructions of FIGS. 25 to 28, the deterioration of the beam quality of the fundamental wave FW having passed the wavelength conversion element 223 (or wavelength conversion element 224) can be suppressed by setting an element having a large thermal conductivity and a good high output resistance as the wavelength conversion element 223 (or wavelength conversion element 224), whereby high conversion efficiency can be obtained also in the wavelength conversion element 233 (or wavelength conversion element 234).

Although Mg-doped $LiNbO_3$ and the like are used as the material of the nonlinear optical crystal having a periodic polarization-inversion structure in the above respective embodiments, non-doped $LiNbO_3$ and $LiNbO_3$ doped with Zn, In or Sc and the like may be used and these are also effective in achieving higher outputs. Since $LiNbO_3$ or doped $LiNbO_3$ has a high nonlinear optical constant, it is capable of high efficiency conversion and effective in achieving higher outputs. Besides, periodic polarization-inversion structures of ferroelectric substances such as $LiTaO_3$, KTP, $KNbO_3$ and the like are also effective in achieving higher outputs. Since a reduction in the power density of the second harmonic is effective for an improvement of the high output resistance, the inventive constructions are effective.

The present invention is particularly effective for the wavelength conversion of a fundamental wave of 1200 nm or shorter. The absorption of a visible light by ultraviolet rays described in the present invention notably occurs with an ultraviolet wavelength of 400 nm or shorter. Thus, the inventive construction is particularly effective for a fundamental wave of 1200 nm or shorter for generating a wavelength of 400 nm or shorter as a sum frequency. Further, concerning outputs, the inventive construction is effective in the case where the output of a second harmonic is equal to or above about 1 to 2 W.

For a wavelength exceeding 1200 nm, the present invention is effective in the case of generating a second harmonic of 10 W or higher. For a wavelength exceeding 1200 nm, the high output resistance is similarly deteriorated by the generation of a light having a wavelength of ¼ of the wavelength λ of a fundamental wave, which is a fourth harmonic of the fundamental wave. However, since the efficiency of the fourth harmonic is low, the present invention is particularly effective in the case where the output of a second harmonic is a high output of 10 W or higher or in the case where the output of the fundamental wave is a pulse train light having a high peak power. For example, if the peak power of the fundamental wave is 100 mW/cm$^2$ or higher, the inventive construction is effective since the deterioration of the high output resistance caused by the generation of the fourth harmonic is problematic.

A Q-switch pulse light source may be used as the fundamental wave light source. In this case, even if an average power of the fundamental wave is low, a high peak power can be utilized, wherefore high efficiency conversion is possible. A repetition frequency is preferably 1 kHz or higher. If the repetition frequency is below 1 kHz, the peak power becomes high and, when power density reaches about 100 mW/cm$^2$, crystal breakdown is caused by laser damage. Further, it is necessary to have a sufficiently large light beam spot and to lower the average power. In order to utilize the Q-switch pulse light source as a high-output light source in this way, the repetition frequency is preferably 1 kHz or higher, more preferably 10 kHz or higher.

A Nd-material such as Nd:YVO$_4$, Nd:YAG or Nd:glass or a Yb-doped material Yb:YAG or Yb:glass can be used for the fundamental wave light source. It is also possible to use a Yb-doped fiber laser. Fiber lasers have a good condensing property and is capable of high efficiency conversion since being able to easily obtain high outputs and having a high beam quality.

In the present invention, PPMgLN doped with 5 mol % of Mg is, for example, used as PPMgLN. A doping amount of Mg is preferably 4.9 mol % to 6 mol %, more preferably 5.6±0.2 mol %. This is because of good optical damage resistance.

Besides the above, PPMgLN doped with Zn, In or Sc can be similarly used. PPMgLN having a stoichiometric composition is also usable since being a highly nonlinear material with a good optical damage resistance. A doping amount of Mg in this case is preferably 1.5 mol % or more. The inventive construction is also effective in other cases where Mg-doped LiTaO$_3$, Mg-doped stoichiometric LiTaO$_3$, KTP and the like are used.

The present invention is summarized as follows from the above respective embodiments. Specifically, a short wavelength light source according to the present invention comprises a fundamental wave light source for generating a fundamental wave; and a plurality of wavelength conversion elements made of nonlinear optical crystals having periodic polarization-inversion structures and adapted to convert a part of the fundamental wave into a second harmonic, wherein the nonlinear optical crystals of the plurality of wavelength conversion elements are different in material or composition.

In this short wavelength light source for wavelength-converting the fundamental wave beam using the plurality of nonlinear optical crystals, high efficiency and higher outputs can be simultaneously achieved by using crystals different in material or composition as the nonlinear optical crystals. The nonlinear optical crystal having high efficiency is used in a region where the power of second harmonic is low and the material having low efficiency, but a strong high output resistance is used in a region where the power of the second harmonic is increased, whereby a high-output second harmonic can be extracted with high efficiency.

The above short wavelength light source preferably further comprises a phase compensating portion for compensating a phase difference between the second harmonic generated by one of the plurality of wavelength conversion elements and the fundamental wave.

Here, in order to add the second harmonics wavelength-converted by a plurality of nonlinear optical crystals, unless the second harmonics are added with the phases thereof matched, they are canceled out by interference to decrease the output. However, since the phase difference between the second harmonic generated by one wavelength conversion element and the fundamental wave is compensated, the fundamental wave can be converted into the second harmonic with high efficiency.

The phase compensating portion is preferably a wedge plate made of a material having different refractive indices for the fundamental wave and the second harmonic.

In this case, the phase difference can be compensated by a simple construction since the phase difference between the second harmonic and the fundamental wave can be compensated by the wedge plate.

It is preferable that the phase compensating portion includes two wedge plates made of a material having different refractive indices for the fundamental wave and the second harmonic; and that the short wavelength light source further comprises an adjusting portion for adjusting relative positions and angles of the two wedge plates.

In this case, since the relative positions and angles of the two wedge plates can be adjusted, the phase difference in a propagation direction between the fundamental wave and the second harmonic can be adjusted and a phase difference in the propagation direction between the second harmonics generated in the wavelength conversion elements can be compensated.

An apex angle θ1 of the wedge plate preferably satisfies a relationship: θ1<λ/(2×R1×Δn)/10 when λ denotes a wavelength of the fundamental wave, R1 a beam radius of the fundamental wave passing the wedge plate and Δn a refractive index difference of the wedge plate between the fundamental wave and the second harmonic.

In this case, the phase difference between the fundamental wave and the second harmonic can be reduced to achieve high efficiency since the phase difference between the fundamental wave and the second harmonic in a beam plane can be compensated to or below λ/10.

The phase compensating portion can be directly formed on an end of the wavelength conversion element. For example, the phase difference can be adjusted by forming a slight angle between an end surface of the periodic polarization-inversion structure and that of an emergent part to adjust the position of the wavelength conversion element. The phase compensating portion can be also realized by a prism made of a material having a wavelength dispersion characteristic for the fundamental wave and the second harmonic. In this case, the phase difference can be adjusted by arranging the prism between the nonlinear optical crystals to adjust a beam transmission distance.

It is preferable that the plurality of wavelength conversion elements are successively arranged in a path of the fundamental wave; that the short wavelength light source further comprises a condensing optical system for condensing the fundamental wave to the wavelength conversion element arranged at a final end in the path of the fundamental wave; and that a focal position of the second harmonic by the condensing optical system is arranged near an incident end of the nonlinear optical crystal of the wavelength conversion element arranged at the final end.

In this case, in the construction for wavelength-converting the fundamental wave into the second harmonic by arranging the plurality of wavelength conversion elements in the beam direction of the fundamental wave, the fundamental wave beam is successively wavelength-converted into second harmonics by the wavelength conversion elements to increase a harmonic output. Thus, the output of the second harmonic is maximized in the wavelength conversion element at the final end. At this time, since the focal position of the second harmonic by the condensing optical system is arranged near the incident end of the nonlinear optical crystal of the wavelength conversion element arranged at the final end, the power density of the second harmonic in the nonlinear optical crystal at the final end can be reduced to improve a resistance to the second harmonic at the final end, thereby being able to obtain a high output.

It is preferable that the plurality of wavelength conversion elements includes a first wavelength conversion element made of a first nonlinear optical crystal having a periodic polarization-inversion structure and adapted to convert a part of the fundamental wave from the fundamental wave light source into the second harmonic and a second wavelength conversion element made of a second nonlinear optical crystal having a periodic polarization-inversion structure and adapted to convert a part of the fundamental wave from the first wavelength conversion element into the second harmonic; and that an angle $\theta 2$ formed between an optical axis of the periodic polarization-inversion structure and a normal line to an incident part in the second nonlinear optical crystal satisfies a relationship: $\theta 2 < \lambda/(2 \times R2 \times \Delta n)/10$ when $\lambda$ denotes a wavelength of the fundamental wave, $R2$ a beam radius of the fundamental wave near the incident part of the second nonlinear optical crystal and $\Delta n$ a refractive index difference between the fundamental wave and the second harmonic in the second nonlinear optical crystal.

In this case, the phase difference between the fundamental wave and the second harmonic can be reduced to achieve high efficiency since the phase difference between the fundamental wave and the second harmonic in a beam plane can be compensated to or below $\lambda/10$.

It is preferable that the plurality of wavelength conversion elements are successively arranged in a path of the fundamental wave; that the short wavelength light source further comprises a condensing optical system for condensing the fundamental wave passing the wavelength conversion element; and the thermal conductivity of the nonlinear optical crystal of the wavelength conversion element arranged at the final end in the path of the fundamental wave is larger than that of the nonlinear optical crystal of the other wavelength conversion element.

In this case, for example, in the construction for wavelength-converting the fundamental wave into the second harmonic by arranging the plurality of wavelength conversion elements in the beam direction of the fundamental wave, the fundamental wave beam is successively wavelength-converted into second harmonics by the wavelength conversion elements to increase a harmonic output. Thus, the output of the second harmonic is maximized in the wavelength conversion element at the final end. At this time, since the thermal conductivity of the nonlinear optical crystal arranged at the final end is set larger, a characteristic with a good high output resistance can be realized and the second harmonics wavelength-converted by the plurality of wavelength conversion elements can be added to obtain a high-output second harmonic.

The condensing optical system is preferably a concave mirror.

In this case, power density in the crystal of the wavelength conversion element can be increased to improve conversion efficiency since the fundamental wave is condensed by the concave mirror. Further, a phase difference of the second harmonic generated in the crystal can be suppressed since no color aberrations of the fundamental wave and the second harmonic occur by using the concave mirror as a reflecting optical system.

It is preferable that the plurality of wavelength conversion elements include a first wavelength conversion element made of a nonlinear optical crystal in the form of a plate thinner than a beam cross section of the fundamental wave and second and third wavelength conversion elements sandwiching the first wavelength conversion element in a direction perpendicular to an optical axis of the fundamental wave and made of second and third nonlinear optical crystals; that the fundamental wave is converted into the second harmonic by simultaneously transmitting the first to third nonlinear optical crystals; and that the thermal conductivity of the first nonlinear optical crystal arranged in an optical axis center of the fundamental wave is larger than those of the second and third nonlinear optical crystals.

In this case, in the construction for forming the wavelength conversion element by bonding the plurality of nonlinear optical crystals in the form of thin plates and causing the fundamental wave to simultaneously transmit the plurality of nonlinear optical crystals in the wavelength conversion element for wavelength conversion, the nonlinear optical crystal having a large thermal conductivity is used in a central part of the transmitting beam where the power density of the second harmonic is high. Thus, a high output resistance can be improved by promoting heat dispersion in the beam central part where the power of the second harmonic is maximized.

The above short wavelength light source preferably further comprises reflection films arranged at end portions of some of the plurality of wavelength conversion elements and adapted to reflect the fundamental wave and the second harmonic.

In this case, since the reflection films are formed on the end portions of the nonlinear optical crystals, the fundamental wave and the second harmonic can be reflected at the end portions to reciprocate in the nonlinear optical crystals a plurality of times, whereby conversion efficiency can be improved.

It is preferable that the plurality of wavelength conversion elements includes a first wavelength conversion element made of a first nonlinear optical crystal having a periodic polarization-inversion structure and a second wavelength conversion element made of a second nonlinear optical crystal having a periodic polarization-inversion structure; that the short wavelength light source further comprises a first and a second concave mirrors; that the first and second wavelength conversion elements are arranged between the first and second concave mirrors; that the fundamental wave is wavelength-converted by the second nonlinear optical crystal after being wavelength-converted by the first nonlinear optical crystal at least once while reciprocating between the first and second concave mirrors a plurality of times; and that the thermal conductivity of the second nonlinear optical crystal is larger than that of the first nonlinear optical crystal.

In this case, in the construction for wavelength-converting the fundamental wave by the second nonlinear optical crystal after being wavelength-converted by the first nonlinear optical crystal at least once while reciprocating between the first and second concave mirrors a plurality of times, the fundamental wave beam is successively wavelength-converted into the second harmonics by the wavelength conversion elements to increase the output of the second harmonic. Thus, the output of the second harmonic is maximized in the second nonlinear optical crystal. At this time, since the thermal conductivity of the second nonlinear optical crystal is larger than that of the first nonlinear optical crystal, a characteristic with a good high output resistance can be realized and the second harmonics wavelength-converted in the plurality of wavelength conversion elements can be added to obtain a high-output second harmonic.

The nonlinear optical crystals of the plurality of wavelength conversion elements are preferably optically bonded or adhered.

In this case, since an optical loss can be reduced and an optical distance can be shortened, the spread of the beam can be suppressed and a stable output can be obtained even upon a temperature change.

The nonlinear optical crystals of the plurality of wavelength conversion elements preferably include a nonlinear optical crystal made of Mg-doped $LiNbO_3$ and a nonlinear optical crystal made of Mg-doped $LiTaO_3$.

In this case, high efficiency wavelength conversion is possible by using Mg-doped $LiNbO_3$ as the nonlinear optical crystal and the high output resistance can be improved by using Mg-doped $LiTaO_3$ as the nonlinear optical crystal.

The plurality of wavelength conversion elements are preferably made of a plurality of nonlinear optical crystals such that angles formed between optical axes of the periodic polarization-inversion structures and a propagation direction of the fundamental wave differ from each other.

In this case, since the plurality of wavelength conversion elements are arranged such that the optical axis of the periodic polarization-inversion structure and the propagation direction of the fundamental wave differs among the plurality of wavelength conversion elements, the overlap of the second harmonics generated in the nonlinear optical crystals can be reduced, whereby the power density of the second harmonic can be reduced to improve a high output resistance.

It is preferable that the plurality of wavelength conversion elements are successively arranged in a path of the fundamental wave; and that the short wavelength light source further comprises a wavelength separating mirror arranged between the plurality of wavelength conversion elements and adapted to separate the fundamental wave and the second harmonic outputted from the wavelength conversion element.

In this case, in the construction for wavelength-converting the fundamental wave into the second harmonic by arranging the plurality of wavelength conversion elements in the beam direction of the fundamental wave, the fundamental wave beam is successively wavelength-converted into the second harmonics by the plurality of nonlinear optical crystals. Since the second harmonic and the fundamental wave are separated by the wavelength separating mirror at an emergent end of each wavelength conversion element and only the fundamental wave is further wavelength-converted in the next nonlinear optical crystal in this construction, it can be prevented that the second harmonic becomes excessively large and a high-output second harmonic can be extracted.

The thermal conductivity of the nonlinear optical crystal of the wavelength conversion element arranged closest to the fundamental wave light source is preferably larger than that of the nonlinear optical crystal of the other wavelength conversion element.

In this case, since the material having the strong high output resistance is arranged in the first stage of the fundamental wave beam, the fundamental wave power is maximum in the first stage of the fundamental wave beam. Thus, even a material having relatively low conversion efficiency is capable of high efficiency conversion and preventing the deterioration of the beam quality of the fundamental wave. Therefore, the deterioration of the conversion efficiency in the nonlinear optical crystal in the later stage can be prevented.

As described above, the short wavelength light source of the present invention uses a plurality of wavelength conversion elements made of different crystals to improve the high output resistance of the wavelength conversion elements and a crystal having a good high output resistance can be used in a region where light power density is high. Thus, the high output resistance can be remarkably improved by suppressing the generation of a thermal lens caused by light absorption and a stable and highly reliable short wavelength light source can be realized. Therefore, its practical effect is large.

This application is based on Japanese Patent Application serial No. 2007-163492, filed in Japan Patent Office on Jun. 21, 2007, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A short wavelength light source, comprising:
   a fundamental wave light source for generating a fundamental wave; and
   a plurality of wavelength conversion elements made of nonlinear optical crystals having periodic polarization-inversion structures and adapted to convert a part of the fundamental wave into a second harmonic, said plurality of wavelength conversion elements including a first wavelength conversion element made of a first nonlinear optical crystal having a periodic polarization-inversion structure and adapted to convert a part of the fundamental wave from the fundamental wave light source into the second harmonic and a second wavelength conversion element made of a second nonlinear optical crystal having a periodic polarization-inversion structure and adapted to convert a part of the fundamental wave from the first wavelength conversion element into the second harmonic,
   wherein the nonlinear optical crystals of the plurality of wavelength conversion elements are different in material or composition.

2. A short wavelength light source according to claim 1, further comprising a phase compensating portion for compensating a phase difference between the second harmonic generated by one of the plurality of wavelength conversion elements and the fundamental wave.

3. A short wavelength light source according to claim 2, wherein the phase compensating portion is a wedge plate made of a material having different refractive indices for the fundamental wave and the second harmonic.

4. A short wavelength light source according to claim 2, wherein:
the phase compensating portion includes two wedge plates made of a material having different refractive indices for the fundamental wave and the second harmonic; and
the short wavelength light source further comprises an adjusting portion for adjusting relative positions and angles of the two wedge plates.

5. A short wavelength light source according to claim 3, wherein an apex angle $\theta 1$ of the wedge plate satisfies a relationship: $\theta 1 < \lambda/(2 \times R1 \times \Delta n)/10$ when $\lambda$ denotes a wavelength of the fundamental wave, R1 a beam radius of the fundamental wave passing the wedge plate and $\Delta n$ a refractive index difference of the wedge plate between the fundamental wave and the second harmonic.

6. A short wavelength light source according to claim 1, wherein:
the plurality of wavelength conversion elements are successively arranged in a path of the fundamental wave;
the short wavelength light source further comprises a condensing optical system for condensing the fundamental wave to the wavelength conversion element arranged at a final end in the path of the fundamental wave; and
a focal position of the second harmonic by the condensing optical system is arranged near an incident end of the nonlinear optical crystal of the wavelength conversion element arranged at the final end.

7. A short wavelength light source according to claim 1, wherein:
the plurality of wavelength conversion elements are successively arranged in a path of the fundamental wave;
the short wavelength light source further comprises a condensing optical system for condensing the fundamental wave passing the wavelength conversion element; and
the thermal conductivity of the nonlinear optical crystal of the wavelength conversion element arranged at the final end in the path of the fundamental wave is larger than that of the nonlinear optical crystal of the other wavelength conversion element.

8. A short wavelength light source according to claim 7, wherein the condensing optical system is a concave mirror.

9. A short wavelength light source according to claim 1, further comprising reflection films arranged at end portions of some of the plurality of wavelength conversion elements and adapted to reflect the fundamental wave and the second harmonic.

10. A short wavelength light source according to claim 1, wherein the nonlinear optical crystals of the plurality of wavelength conversion elements are optically bonded or adhered.

11. A short wavelength light source according to claim 1, wherein the nonlinear optical crystals of the plurality of wavelength conversion elements include:
a nonlinear optical crystal made of Mg-doped $LiNbO_3$, and
a nonlinear optical crystal made of Mg-doped $LiTaO_3$.

12. A short wavelength light source according to claim 1, wherein the plurality of wavelength conversion elements are made of a plurality of nonlinear optical crystals such that angles formed between optical axes of the periodic polarization-inversion structures and a propagation direction of the fundamental wave differ from each other.

13. A short wavelength light source according to claim 1, wherein:
the plurality of wavelength conversion elements are successively arranged in a path of the fundamental wave; and
the short wavelength light source further comprises a wavelength separating mirror arranged between the plurality of wavelength conversion elements and adapted to separate the fundamental wave and the second harmonic outputted from the wavelength conversion element.

14. A short wavelength light source according to claim 13, wherein the thermal conductivity of the nonlinear optical crystal of the wavelength conversion element arranged closest to the fundamental wave light source is larger than that of the nonlinear optical crystal of the other wavelength conversion element.

15. A short wavelength light source, comprising:
a fundamental wave light source for generating a fundamental wave; and
a plurality of wavelength conversion elements made of nonlinear optical crystals having periodic polarization-inversion structures and adapted to convert a part of the fundamental wave into a second harmonic, said plurality of wavelength conversion elements including
a first wavelength conversion element made of a first nonlinear optical crystal having a periodic polarization-inversion structure and adapted to convert a part of the fundamental wave from the fundamental wave light source into the second harmonic and
a second wavelength conversion element made of a second nonlinear optical crystal having a periodic polarization-inversion structure and adapted to convert a part of the fundamental wave from the first wavelength conversion element into the second harmonic; and
an angle $\theta 2$ formed between an optical axis of the periodic polarization-inversion structure and a normal line to an incident part in the second nonlinear optical crystal satisfies a relationship: $\theta 2 < \lambda/(2 \times R2 \times \Delta n)/10$ when $\lambda$ denotes a wavelength of the fundamental wave, R2 a beam radius of the fundamental wave near the incident part of the second nonlinear optical crystal and $\Delta n$ a refractive index difference between the fundamental wave and the second harmonic in the second nonlinear optical crystal,
wherein the nonlinear optical crystals of the plurality of wavelength conversion elements are different in material or composition.

16. A short wavelength light source, comprising:
a fundamental wave light source for generating a fundamental wave; and
a plurality of wavelength conversion elements made of nonlinear optical crystals having periodic polarization-inversion structures and adapted to convert a part of the fundamental wave into a second harmonic. said plurality of wavelength conversion elements including
a first wavelength conversion element made of a nonlinear optical crystal in the form of a plate thinner than a beam cross section of the fundamental wave, and
second and third wavelength conversion elements sandwiching the first wavelength conversion element in a direction perpendicular to an optical axis of the fundamental wave and made of second and third nonlinear optical crystals;
the fundamental wave is converted into the second harmonic by simultaneously transmitting the first to third nonlinear optical crystals; and the thermal conductivity of the first nonlinear optical crystal arranged in an optical axis center of the fundamental wave is larger than those of the second and third nonlinear optical crystals, wherein the nonlinear optical crystals of the plurality of wavelength conversion elements are different in material or composition.

17. A short wavelength light source, comprising:

a fundamental wave light source for generating a fundamental wave; and a plurality of wavelength conversion elements made of nonlinear optical crystals having periodic polarization-inversion structures and adapted to convert a part of the fundamental wave into a second harmonic, said plurality of wavelength conversion elements including, a first wavelength conversion element made of a first nonlinear optical crystal having a periodic polarization-inversion structure and a second wavelength conversion element made of a second nonlinear optical crystal having a periodic polarization-inversion structure;

the short wavelength light source further comprises a first and a second concave mirrors;

the first and second wavelength conversion elements are arranged between the first and second concave mirrors;

the fundamental wave is wavelength-converted by the second nonlinear optical crystal after being wavelength-converted by the first nonlinear optical crystal at least once while reciprocating between the first and second concave mirrors a plurality of times; and the thermal conductivity of the second nonlinear optical crystal is larger than that of the first nonlinear optical crystal, wherein the nonlinear optical crystals of the plurality of wavelength conversion elements are different in material or composition.

* * * * *